US005398304A

United States Patent [19]
Bauman et al.

[11] Patent Number: 5,398,304
[45] Date of Patent: Mar. 14, 1995

[54] CONTROL PROCESS FOR ARTIFICIAL INTELLIGENCE SOFTWARE SHELL

[75] Inventors: Douglas A. Bauman, Apollo; Simon Lowenfeld, Export; Brian A. Schultz; Robert W. Thompson, Jr., both of Pittsburgh, all of Pa.

[73] Assignee: Mitsubishi Denki Kabushiki Kaisha, Tokyo, Japan

[21] Appl. No.: 994,668

[22] Filed: Dec. 22, 1992

[51] Int. Cl.⁶ .............................................. G06F 15/18
[52] U.S. Cl. .......................................... 395/53; 395/50
[58] Field of Search ....................... 395/53, 77, 68, 50, 395/61

[56] References Cited

PUBLICATIONS

Jagannathan, Dodhiawala & Baum, Blackboard Architectures and Applications, 1989, cover, frontispice, pp. 178-299, Academic Press, San Diego, Calif.
Nii, Blackboard Systems, Summer 1986, pp. 38-53, AI Magazine.
Nii, Blackboard Systems, Aug. 1986, pp. 82-106, AI Magazine.
Slade, Case-Based Reasoning, 1991, pp. 42-55, AI Magazine.
Hayes-Roth, A Blackboard Architecture for Control, 1985, pp. 251-321, AI Magazine.
Corkill, D., "Blackboard Systems", AI Expert, Sep. 1991, 41-47.
Buta, et al., "Case-Based Reasoning for Market Surveillance," First Intl. Conf. on Artificial Intelligence on Wall Street, Oct. 1991, 116-121.
Bardsz, et al., "A Blackboard Architecture to Support Case-Based Reasoning in Mechanical Design," Advances in Design Automation—vol. I, Sep. 1992, 337-343.
Kopeikina, et al., "Case Based Reasoning for Continuous Control," Proc. Workshop on Case-Based Reasoning, May 1988, 250-259.
Barr, et al., The Handbook of Artificial Intelligence vol. IV, Addison-Wesley Pub. Co., 1989, 4-17.
Larner, D. L., "Factories, Objects, & Blackboards," AI Expert, Apr. 1990.
Alexander, et al., "Case-Based Planning for Simulation," First Intl. Conf. on Expert Planning Systems, Jun. 1990, 217-220.
Chen, et al., "An Intelligent Control Architecture for Expert Process Control," Twenty-Third Southeastern Symp. on Syst. Theory, Mar. 1991, 323-326.
Lyle, F., "Bridging Networks," UNIX Review, May 1991, p. 46(7).
Wang, et al., "A Design-Dependent Approach to Integrated Structural Design," Artificial Intelligence in Design, Jun. 1991, 151-170.
Advertisement, in AI Expert, Sep. 1991, for Franz, Inc.

*Primary Examiner*—Robert W. Downs
*Attorney, Agent, or Firm*—Wolf, Greenfield & Sacks

[57] ABSTRACT

An artificial intelligence software shell for plant operation simulation includes a blackboard module including a database having objects representing plant elements and concepts. A rule-based knowledge source module or a case-based knowledge source module, in communication with the blackboard module, operate on specific predefined blackboard objects. An input data module, in communication with the blackboard module, enables a user to input data to the shell. A control module, in communication with the knowledge source modules and the input data module, receives all input data and controls operation of the knowledge source modules in accordance with a predetermined knowledge source priority scheme. The control module including an event detector module having a message evaluator that checks messages for syntax errors before searching a hash table structure in the event detector.

46 Claims, 28 Drawing Sheets

```
initialize/load files repeat forever
    wait for message
    if stop message then exit
    else
        parse data message
        if message incorrect then NACK
        else
            forward message to blackboard process/echo bb response
            for each data point received
                if data point is in hash table
                    data point.value = new value
                    data point.updated = true
                else eliminate data point
            for each data point left
                for each expression in its indirect expression list
                    if      expression has not been evaluated yet
                            AND
                            associated KS not already on KS list
                            AND
                            expression evaluates to true
                    then    add KS to KS list
                            expression.updated = true
                            expression.last value = current value
            send KS list to activation/agenda manager process
            for each data point left
                data point.updated = false
            for each expression in expression list
                expression.updated = false
```

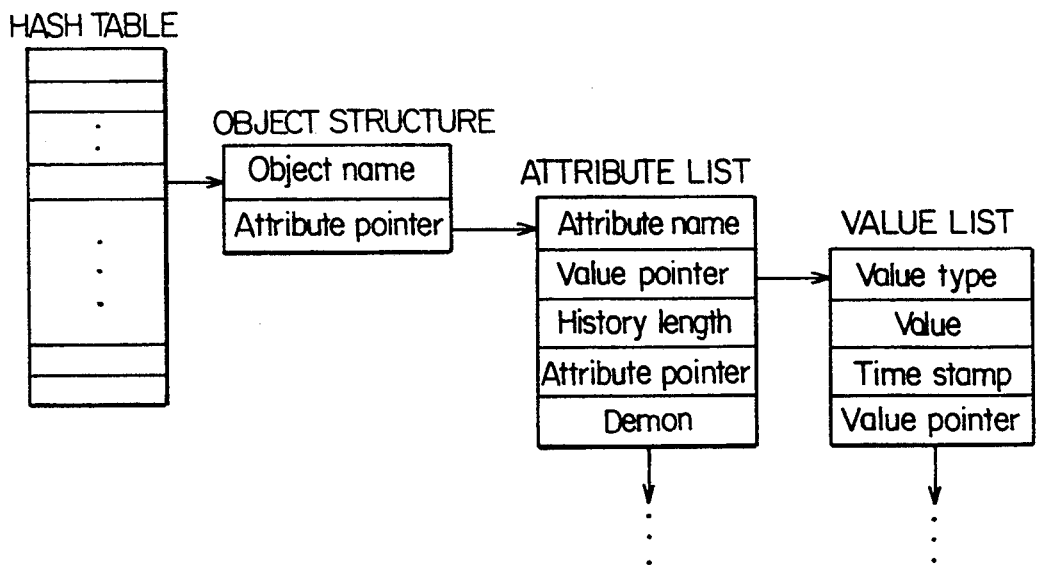

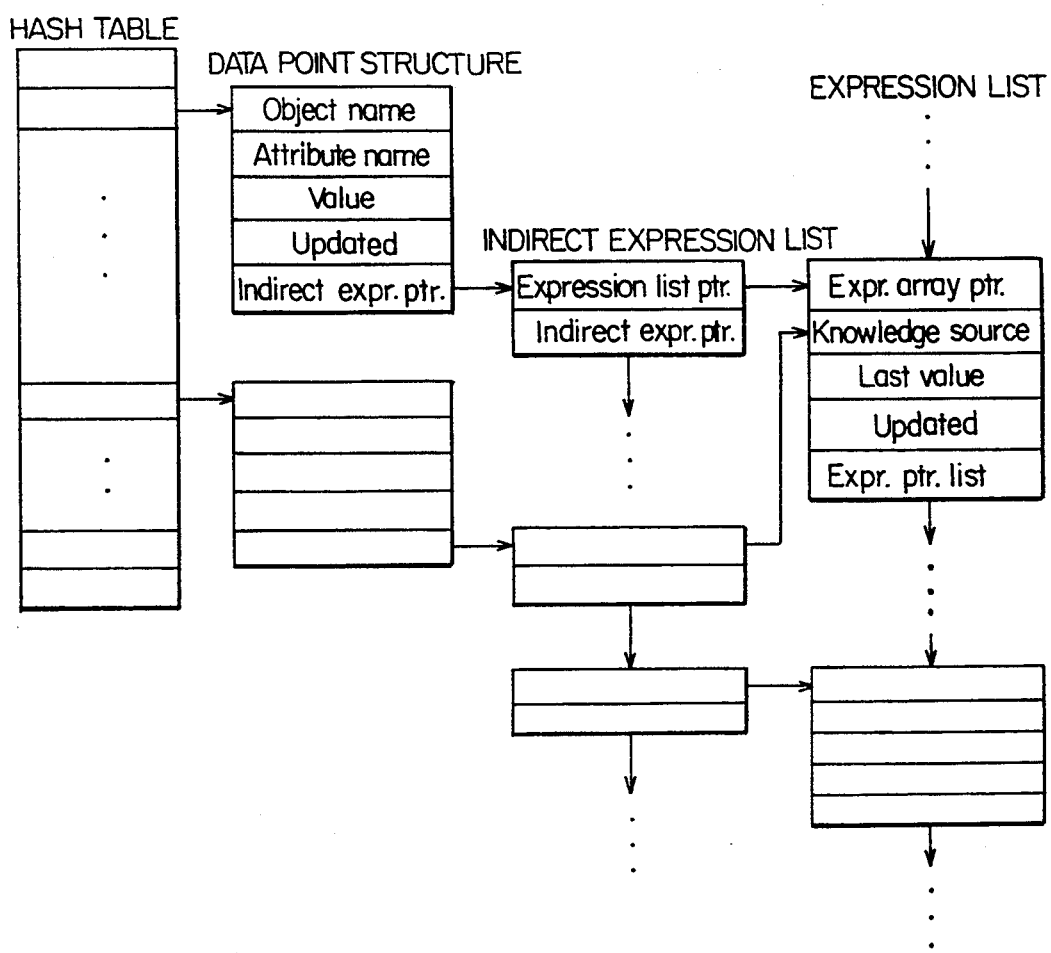

Fig.8

```
initialize/load files repeat forever
    wait for message
    if stop message then exit
    else
        parse data message
        if message incorrect then NACK
        else
            forward message to blackboard process/echo bb response
            for each data point received
                if data point is in hash table
                    data point.value = new value
                    data point.updated = true
                else  eliminate data point
            for each data point left
                for each expression in its indirect expression list
                    if      expression has not been evaluated yet
                            AND
                            associated KS not already on KS list
                            AND
                            expression evaluates to true
                    then    add KS to KS list
                            expression.updated = true
                            expression.last value = current value
            send KS list to activation/agenda manager process
            for each data point left
                data point.updated = false
            for each expression in expression list
                expression.updated = false
```

Fig. 9

```
initialize/load files repeat until stop message
wait for message from event detector
for each knowledge source in message
        if preconditions evaluate to true
                if knowledge source already on timer queue
                        remove from timer queue
                        reschedule it on timer queue
                if a knowledge source is currently running
                        wait for it to finish
                activate knowledge source wait for timer signal
pop first entry from timer queue
if a knowledge source is currently running
        wait for it to finish
activate knowledge source
reschedule knowledge source for its next run
set timer to next entry in timer queue
```

Fig. 10

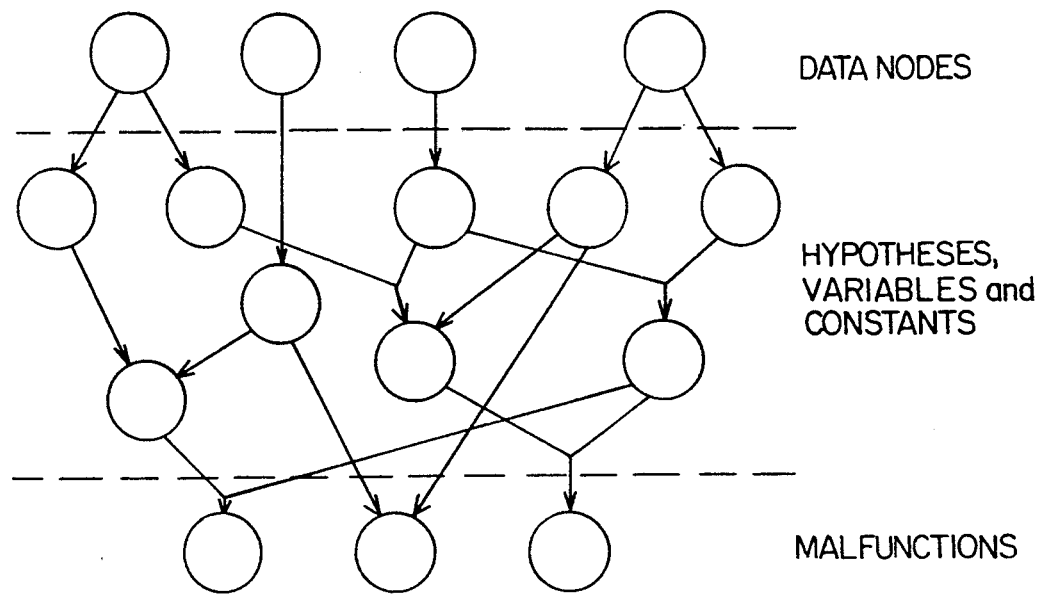

DATA NODES

HYPOTHESES, VARIABLES and CONSTANTS

MALFUNCTIONS

Fig. 11

DATA NODE

| name |
|---|
| object |
| description |
| value |
| updated |
| mapping-function |

HYPOTHESIS NODE

| name |
|---|
| (object) |
| description |
| mb |
| md |
| cf |
| updated |
| supporting-rules |
| supported-rules |

MALFUNCTION NODE

| name |
|---|
| object |
| description |
| mb |
| md |
| cf |
| updated |
| priority |
| severity |
| supporting-rules |

Fig. 12

RULE

| name |
|---|
| description |
| context |
| evidence-text |
| evidence-expr. |
| evidence-list |
| hypothesis-list |
| action-list |
| sf |
| nf |
| alpha |
| beta |
| change-based-val |
| fired |

META-RULE

| name |
|---|
| description |
| context |
| source-text |
| source-expr. |
| source-list |
| target-list |
| target-slot |
| function |
| change-based-val |
| fired |

Fig.13

| CONSTANT |
|---|
| name |
| description |
| value |
| supported-rules |

| CONTEXT |
|---|
| name |
| description |
| value |

| PIECE-WISE-LINEAR |
|---|
| name |
| description |
| xy-list |

| VARIABLE |
|---|
| name |
| description |
| value |
| updated |
| supporting-rules |
| supported-rules |

| EVALUATOR |
|---|
| name |
| description |
| expression-text |
| expression |
| expression-list |
| variable |
| change-based-val |
| context |

| SYSTEM |
|---|
| name |
| description |
| data-nodes |
| hypotheses |
| malfunctions |
| rules |
| meta-rules |
| evaluators |
| context |
| piece-wise-lin. |
| variables |
| constants |

Fig.14

```
request data from blackboard
for each data node
        if new value then
                set data node value slot
                evaluate mapping function
                add node to new node list
for each node in new node list
        clear updated slot in all rules and nodes rooted in this node
for each node in new node list
        for each of this node's supported rules
                if      the rule is in context AND
                        the evidence is available AND
                        the evidence is in range
                then    fire the rule:
                                update rule's hypotheses
                                execute rule's actions
                                add rule's hypotheses to node list
```

Fig.15

| | | |
|---|---|---|
| if $CF>0$ (evidence is true) | if $SF=1$ then $CF_{evidence}$ | changes $MB_{hypothesis}$ |
| | if $0<SF<1$ then $SF^*CF_{evidence}$ | changes $MB_{hypothesis}$ |
| | if $SF=0$ then no change | |
| | if $-1<SF<0$ then $-SF^*CF_{evidence}$ | changes $MD_{hypothesis}$ |
| | if $SF=-1$ then $CF_{evidence}$ | changes $MD_{hypothesis}$ |
| if $CF<0$ (evidence is false) | if $NF=1$ then $CF_{evidence}$ | changes $MD_{hypothesis}$ |
| | if $0<NF<1$ then $NF^*CF_{evidence}$ | changes $MD_{hypothesis}$ |
| | if $NF=0$ then no change | |
| | if $-1<NF<0$ then $-NF^*CF_{evidence}$ | changes $MB_{hypothesis}$ |
| | if $NF=-1$ then $CF_{evidence}$ | changes $MB_{hypothesis}$ |

Fig. 17

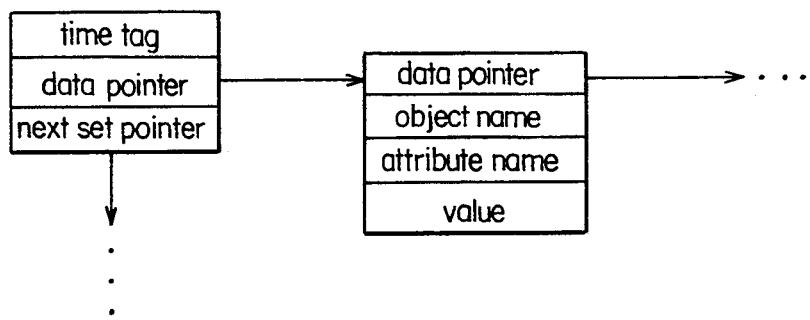

Fig. 18

```
        if system file then get SYS file name
        else
                get BB file name
                repeat get RB file name until done
                repeat get CB file name until done
                save all file names in SYS file start BB process
        start ED process
        start AM process
        for each KB start KB process
        for each CB start CB process repeat      set run parameters
                    get data file name
                    load data file
                    display time required for run/get time scale factor
                    if first data file then start MMI process
                        repeat      send data set to event detector
                                    set timer for next set of data
                                    sleep
                        until no more data
        until done
```

Fig. 20

| MESSAGE | CODE |
|---|---|
| acknowledgment | ACK |
| notification of failure | NACK |
| request for data | DATAREQ |
| data supplied | DATASUP |
| knowledge source list | KSSUP |

Fig. 21

| MESSAGE | CODE |
|---|---|
| start | START |
| stop | STOP |
| activate process | ACTIV |
| set parameters | SETPARAM |
| acknowledgement | ACK |
| notification of failure | NACK |

Fig. 22

| MESSAGE | CODE |
|---|---|
| NACK | 0 |
| ACK | 1 |
| DATAREQ | 2 |
| DATASUP | 3 |
| KSSUP | 4 |
| START | 5 |
| STOP | 6 |
| ACTIV | 7 |
| SETPARAM | 8 |

Fig.23

```
DATAREQ
number_of_objects
object_name_1
        number_of_attributes
        attribute_name_1
        .
        .
        .
        attribute_name_n
object_name_2
        number_of_attributes
        attribute_name_1
        .
        .
        .
        attribute_name_n
.
.
.
object_name_n
        number_of_attributes
        attribute_name_1
        .
        .
        .
        attribute_name_n
```

Fig.25

```
KSSUP
number_of_knowledge_sources
knowledge_source_ID_1
knowledge_source_ID_2
.
.
.
knowledge_source_ID_n
```

Fig. 24

```
DATASUP
number_of_objects
object_name_1
        number_of_attributes
        attribute_name_1
                number_of_values
                value_type
                value_1
                time_1
                value_type
                value_2
                time_2
                .
                .
                value_n
                time_n
        attribute_name_2
        .
        .
        attribute_name_n
                number_of_values
                .
                .
                time_n
.
.
object_name_n
        attribute_name_1
        .
        .
        attribute_name_n
                number_of_values
                .
                .
                time_n
```

Fig. 26

```
SETPARAM
number_of_parameters
parameter_code_1
status_1
.
.
parameter_code_n
status_n PARAMETER        CODE
trace             0
log               1
step              2
breakpoint        3

STATUS           CODE
off               0
on                1
```

Fig. 27

```
BLACKBOARD FILE: bb_structure_description_filename.BB
RULE BASE FILE: rule_based_description_filename_1.RB
                .
                .
RULE BASE FILE: rule_based_description_filename_n.RB
CASE BASE FILE: case_description_filename_1.CB
                .
                .
CASE BASE FILE: case_description_filename_n.CB
```

Fig.28

```
OBJECT: object_name_1
      ATTRIBUTE: attribute_name_1
      NUMBER OF VALUES: number_of_values
      DEMON: demon_name
      VALUE TYPE: value_type ATTRIBUTE: attribute_name_2
      NUMBER OF VALUES: number_of_values
      DEMON: demon_name
      VALUE TYPE: value_type
            .
            .
      ATTRIBUTE: attribute_name_n
      NUMBER OF VALUES: number_of_values
      DEMON: demon_name
      VALUE TYPE: value_type
  .
  .
OBJECT: object_name_n
```

Fig. 29A

```
------------------------------------
EVENTS
EXPRESSION: (evaluation_expression_1)
EXPRESSION: (evaluation_expression_2)
·
·
EXPRESSION: (evaluation_expression_n)

------------------------------------
PRECONDITIONS
EXPRESSION: (evaluation_expression_1)
EXPRESSION: (evaluation_expression_2)
·
·
EXPRESSION: (evaluation_expression_n)

------------------------------------
RULE BASE STRUCTURE

------------------------------------
PIECEWISE LINEARS

NAME: pwl_name_1
DESCRIPTION: descriptive_text
XY-LIST: ((x_value_1,y_value_1)...(x_value_n,y_value_n))
·
·
NAME: pwl_name_n
·
·

------------------------------------
CONTEXTS

NAME: context_name_1
DESCRIPTION: descriptive_text
·
·
NAME: context_name_n
·
·
```

Fig. 29B

```
-------------------------------
DATA NODES

NAME: data_name_1
OBJECT: object_name/attribute_name
DESCRIPTION: descriptive_text
MAPPING RULE: pwl_name
 .
 .
 .
NAME: data_name_n
 .
 .
 .
-------------------------------
HYPOTHESES NAME: hypothesis_name_1
OBJECT: <object_name/attribute_name>
DESCRIPTION: descriptive_text
 .
 .
 .
NAME: hypothesis_name_n
 .
 .
 .
-------------------------------
MALFUNCTIONS NAME: malfunction_name_1
OBJECT: object_name/attribute_name
DESCRIPTION: descriptive_text
 .
 .
 .
NAME: malfunction_name_n
 .
 .
 .
-------------------------------
VARIABLES NAME: variable_name_1
OBJECT:<object_name/attribute_name>
DESCRIPTION: descriptive_text
 .
 .
 .
NAME variable_name_n
 .
 .
 .
```

Fig.29C

```
- - - - - - - - - - - - - - - - - - - - - - -
CONSTANTS

NAME: constant_name_1
  DESCRIPTION: descriptive_text
  VALUE: constant_value
    .
    .
  NAME: constant_name_n
    .
    .
- - - - - - - - - - - - - - - - - - - - - - -
RULES NAME: rule_name_1
  DESCRIPTION: descriptive_text
  EVIDENCE TEXT: evaluation_expression
  HYP. LIST: (hypothesis_name <,hypothesis_name>...)
  ACTION LIST: (action_1 <,action_2>...)
  ALPHA: alpha_number
  BETA: beta_number
  SF: SF_number
  NF: NF_number
  CONTEXT: context_name
    .
    .
  NAME: rule_name_n
    .
    .
- - - - - - - - - - - - - - - - - - - - - - -
METARULES NAME: metarule_name_1
  DESRIPTION: descriptive_text
  SOURCE: evaluation_expression
  TARGET LIST: (target_1 <,target_2>...)(context_name or rule_name)
  TARGET SLOT: (value or SF or NF)
  FUNCTION: function_name or pwl_name
  CONTEXT: context_name
    .
    .
  NAME: metarule_name_n
    .
    .
```

Fig. 30A

```
-----------------------------------
EVENTS

EXPRESSION: (evaluation_expression_1)
EXPRESSION: (evaluation_expression_2)
  .
  .
EXPRESSION: (evaluation_expression_n)
-----------------------------------
PRECONDITIONS EXPRESSION: (evaluation_expression_1)
EXPRESSION: (evaluation_expression_2)
  .
  .
EXPRESSION: (evaluation_expression_n)
-----------------------------------
CASE BASE STRUCTURE
-----------------------------------
CASES CASE ID: case_name_text
      CASE OBJECT/ATTRIBUTE: object_name/attribute_name for dynamic data OBJECT: object_name_1
    ATTRIBUTE: attribute_name
    VALUE LIST: ((value_1,time_1)(value_2,time_2)
              ...(value_n,time_n))

or for static data

OBJECT: object_name_1
    ATTRIBUTE: attribute_name
    VALUE: value repeat for all object attributes used to define a case .
  .
CASE ID  case_name_text
  .
  .
```

*Fig.30B*

```
----------------------------
FUNCTIONS AND WEIGHTS
    OBJECT: object_name_1
    ATTRIBUTE: attribute_name
    FUNCTION: (evaluation_expression_1...<,evaluation_expression_n>)

(this is a list of functions: one for each value in the attribute's history)
    WEIGHT: weight_value
    <WEIGHT LIST: (weight_value_1... <weight_value_n>)> repeat for all object attributes used to define a case
```

*Fig.31*

```
TIME: time_stamp_1
    OBJECT: object_name_1
    ATTR.,VALUE: attribute_name_1, value
    ATTR.,VALUE: attribute_name_2, value
                    .
                    .
    ATTR.,VALUE: attribute_name_n, value OBJECT: object_name_2
    ATTR.,VALUE: attribute_name_1, value
    ATTR.,VALUE: attribute_name_2, value
                    .
                    .
    ATTR.,VALUE: attribute_name_n, value
                    .
                    .
    OBJECT: object_name_n
    ATTR.,VALUE: attribute_name_1, value
                    .
                    .
    ATTR.,VALUE: attribute_name_n, value repeat for all data sets
```

Fig. 32

Format for a RLOGF (Rule Based)

TIME: time_1
DIAGNOSIS: descriptive_text
CF:CF
PRIORITY: priority_number
SEVERITY: severity_number
.
.
TIME: time_n
DIAGNOSIS: descriptive_text
CF:CF
PRIORITY: priority_number
SEVERITY: severity_number In addition, free-form descriptive text may appear interspersed in the file.

Format for a CLOGF (Case Based)

TIME: time_1
SIMILARITY VALUE: similarity_value
CASE NAME: case_name_text
.
.
TIME: time_n
SIMILARITY VALUE: similarity_value
CASE NAME: case_name_text

Fig. 33

```
------------------------------
DIAGNOSES

RANK:1
RANK VALUE: rank_value_1
TIME: time_1
DIAGNOSIS: diagnosis_text
KNOWLEDGE SOURCE: knowledge_source_ID RANK:2
RANK VALUE: rank_value_2
TIME: time_2
DIAGNOSIS: diagnosis_text
KNOWLEDGE SOURCE: knowledge_source_ID RANK:n
RANK VALUE: rank_value_n
TIME: time_n
DIAGNOSIS: diagnosis_text
KNOWLEDGE SOURCE: knowledge_source_ID

------------------------------
CASES

RANK:1
SIMILARITY VALUE: similarity_value_1
TIME: time_1
CASE NAME: case_name_text
KNOWLEDGE SOURCE: knowledge_source_ID
    .
    .

RANK: N
SIMILARITY VALUE: similarity_value_n
TIME: time_n
CASE NAME: case_name_text
KNOWLEDGE SOURCE: knowledge_source_ID
```

Fig. 34

```
OBJECT: object_name_1

ATTRIBUTE: attribute_name_1
    NUMBER OF VALUES: number_of_values
    DEMON: demon_name
    VALUE TYPE: value_type
    VALUE@TIME: value_1@time_1
    VALUE TYPE: value_type
    VALUE@TIME: value_2@time_2
                    :
    VALUE@TIME: value_n@time_n ATTRIBUTE: attribute_name_2
    NUMBER OF VALUES: number_of_values
    DEMON: demon_name
    VALUE TYPE: value_type
    VALUE@TIME: value_1@time_1
    VALUE TYPE: value_type
    VALUE@TIME: value_2@time_2
                    :
    VALUE@TIME: value_n@time_n
                    :
    ATTRIBUTE: attribute_name_n
    NUMBER OF VALUES: number_of_values
    DEMON: demon_name
    VALUE TYPE: value_type
    VALUE@TIME: value_1@time_1
    VALUE TYPE: value_type
    VALUE@TIME: value_2@time_2
                    :
    VALUE@TIME: value_n@time_n repeat for all blackboard objects
```

CONTROL PROCESS FOR ARTIFICIAL INTELLIGENCE SOFTWARE SHELL

RELATED APPLICATIONS

The present application relates to application Ser. No. 07/995,209, filed Dec. 22, 1992; application Ser. No. 07/994,664, filed Dec. 22, 1992; and application Ser. No. 08/000,873, filed Jan. 5, 1993.

FIELD OF THE INVENTION

The present invention relates to an artificial intelligence software system for plant operation simulation and, more particularly, to a control process for such a system.

BACKGROUND OF THE INVENTION

Factory and processing plant environments are so diverse that they are difficult to describe in specific terms. Many difficulties are encountered in trying to understand plant operation in a general way because of this diversity. There do exist, however, in the field of manufacturing, some common operational characteristics that a factory or processing plant should possess for efficiency purposes. In particular, it has become increasingly desirable for a plant to be operated in an optimal manner with respect to material resources, human resources and time. Areas of focus, in this regard, include the utilization of sound engineering principals, economic planning and safety.

Simulation modules of plant operation, which incorporate specific knowledge of plant operation, aid in implementing such principals in practice. Because of the complexity of most plant environments, however, experts such as manufacturing engineers only have knowledge limited to the particular areas of the plant domain within which they work. This knowledge may exist in different forms ranging from analytical models to heuristics. Because of the incompatibility of the forms of knowledge, it is very difficult to incorporate the knowledge in a complete plant model.

The application of computer technology in the plant environment is commonplace. In all areas of production, one can find computers used for a variety of tasks from control of equipment to data logging. One particular area that is growing is the use of computers to implement knowledge-based systems, or expert systems, in the plant domain to aid in achieving plant operation efficiency. A knowledge-based system contains a representation of knowledge about some aspect of the plant operation, and it provides diagnoses or recommendations by using some form of logical reasoning or heuristics to process the knowledge. The systems represent a distinct use of computers beyond numerically-based applications. Attempts have been made to create a knowledge-based system with which one can combine the power of the computer with the expertise of plant operators to yield a tool that can assist in the operation of the plant, and provide diagnostic information that can be used to monitor the plant and its resources. Because a plant may have many different knowledge sources and expert systems, a method of integration would allow interaction among different systems and would permit broader issues of plant operation to be incorporated within the computation framework. Because of the different forms of knowledge sources and expert systems, such a method of integration has not been achieved to model complete plant operation. In addition, because every plant differs somewhat in specific areas, a system has not been realized which possesses functional modules in an overall structure sufficiently broad to be useful in diverse plant environments.

In order to achieve such a system, it is important to model characteristics of every plant that are common. One such characteristic common to every plant is that in some complex way, inputs (raw materials) are processed to produce outputs (finished products). Another common aspect is that all plants involve processing over time. Unfortunately, a complete analytical description of a plant involving full time dependencies is impractical, if not impossible. Information concerning a plant operation is typically incomplete and fragmentary. Abundant information relating to plant operation, however, may exist, but in order to create a system, it must be gathered and organized into such a system. This has not been done successfully in the past with knowledge-based systems.

Accordingly, a general object of the present invention is to provide a knowledge-based system which possesses functional modules in an overall structure sufficiently broad to be useful in diverse plant environments.

Another object of the present invention is to provide a knowledge-based system which can combine the power of the computer with expertise of plant operators to yield a tool that can provide diagnostic information and monitor operation of the plant.

Another object of the present invention is to provide a control process for a knowledge-based system for controlling operation of the system in an efficient and orderly fasion.

SUMMARY OF THE INVENTION

To accomplish the foregoing and other objects, features and advantages of the invention, there is provided an artificial intelligence software shell for plant operation simulation which includes a blackboard module including a database having objects representing plant elements and concepts. At least one knowledge source module including an artificial intelligence operation scheme, in communication with the blackboard module, operates on specific predefined blackboard objects. An input data module, in communication with the blackboard module, enables a user to input data to the system. A control module, in communication with the input data module and the at least one knowledge source module, receives an input data and controls operation of the at least one knowledge source.

The control module includes an event detector module and an activation/agenda manager module. The event detector module, in communication with the input data module, receives all input data and determines when the at least one knowledge source should execute. The activation/agenda manager module, in communication with the at least one knowledge source module and the event detector module, executes the at least one knowledge source module in accordance with a predetermined knowledge source priority scheme.

In a preferred embodiment of the present invention, the at least one knowledge source module includes a rule-base knowledge source module and/or a case-based knowledge source module. The rule-based knowledge source module has a forward-chaining belief propogation scheme including rules in if-then-else form with associated levels of belief. The case-based knowledge source module has a data comparison scheme including predefined patterns and conditions, whereupon execution of the case-based knowledge source, the conditions are inferred to be true if a certain level of closeness is found between the received data and the patterns.

In an alternate embodiment of the present invention the at least one knowledge source module further includes a model-based knowledge source module having interconnected modules with simulation relationships and inference relationships.

BRIEF DESCRIPTION OF THE DRAWINGS

Numerous other objects, features and advantages of the invention should now become apparent to those skilled in the art upon a reading of the following detailed description taken in conjunction with the accompanying drawings, in which:

FIG. 5 is a block diagram of a blackboard data structure;

FIG. 6 is a list of value type codes for the blackboard;

FIG. 7 is a block diagram of event detector data structures;

FIG. 8 is a logic list of event detector software;

FIG. 9 is a list of activation/agenda manager logic flow;

FIG. 10 is a diagram of a rule network example;

FIG. 11 is a diagram of rule-based node structures;

FIG. 12 is a diagram of rule structures;

FIG. 13 is a diagram of rule structures;

FIG. 14 is a list of rule-based knowledge source logic flow

FIG. 15 is a list of formulas for combining evidence with rule belief;

FIG. 17 is a diagram of an input data structure;

FIG. 18 is a list of logic flow of user interface software;

FIG. 20 is a list of data message type codes;

FIG. 21 is a list of control message type codes;

FIG. 22 is a list of message type codes;

FIG. 23 is a list of a particular message format;

FIG. 24 is a list of a particular message format;

FIG. 25 is a list of a particular message format;

FIG. 26 is a list of a particular message format;

FIG. 27 is a list of a system file format;

FIG. 28 is a list of a blackboard structure description file format;

FIGS. 29A, 29B and 29C are a list of a rule-based description file format;

FIGS. 30A and 30B are a list of a case-based description file format;

FIG. 31 is a list of an input data file format;

FIG. 32 is a list of a log file format;

FIG. 33 is a list of a diagnostic file format;

FIG. 34 is a list of a blackboard status file format; and

DETAILED DESCRIPTION

I. Introduction

The present invention provides an artificial intelligence software shell in which a blackboard database includes objects representing plant items. Expert system knowledge sources, in accordance with a temporal priority scheme, execute and modify specific objects. A user can view the status of the objects to diagnose and monitor plant operation. An application developer (plant expert for a particular application) must develop the objects and knowledge-based rules before the system can be used. A control process, in accordance with the present invention, receives all input data, and determines when each knowledge source should execute, in accordance with a predetermined knowledge source priority scheme.

The domain shell can be described from two viewpoints. One way to look at the domain shell's organization is from the knowledge-based system functional view. For the domain shell this is a description of the blackboard architecture, its components and their interaction. This is the internal view of the system. The other view is from the user's standpoint, that is, how does the system appear to the user as he interacts with it or uses it. The details of the interfaces and the operating sequences that occur are the external system view. While these representations are different, they are strongly related to each other.

Figure 1:
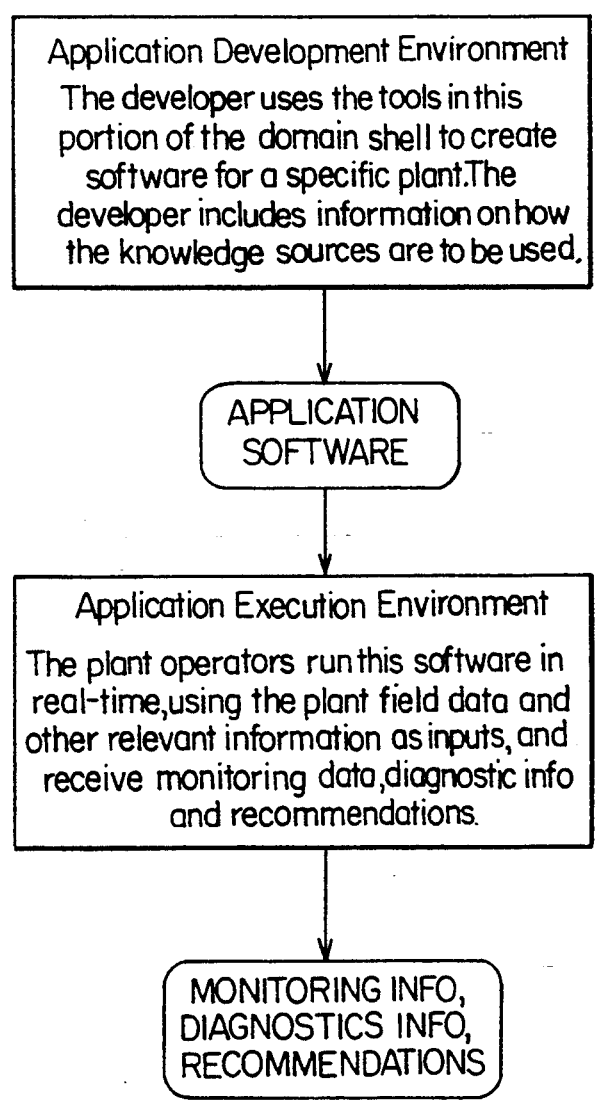
FIG. 1 is a block diagram of the overall system environment of the present invention.

The overall system environment diagram is given in FIG. 1. The domain shell will consist of an environment in which a specific application program can be developed. This is known as the application development environment. It has the functions that are used by the application developer to enter, modify and test the structure for the application. These structures form an instantiation of the blackboard approach, including a control framework. The knowledge sources are created and entered at this stage as well. The domain shell described in this document will contain the tools and framework facilitating the creation of applications for any plant environment. An application developer would benefit from the existence of structures common to his particular plant type. If structures representing equipment types and associated icons were already features of the shell, the developer could use them without having to create them himself. The existence of such tools would also have the benefit of standardizing the graphical appearance of the running system. Clearly, there are types of plants (such as steel mills or food processing plants) which would benefit from having a set of structures that are specific to the plant type (such as icons of a roller press for the steel mill). As a first step, the developer could create a steel mill domain shell by adding to the domain shell the set of structures that would be useful to the application developer in a particular steel mill. Then the application developer in any steel mill could use the created structures, thus easing the burden of development. The increase in value of the plant type specific domain shell suggests that the level of customization of the domain shell be carefully considered to maximize the shell's utility.

After the application development is completed and tested, it is installed on-line in the plant environment. The system then enters the application execution environment. Here the users are the plant personnel that interact with the system to receive the system recommendations and take appropriate action.

Figure 2:
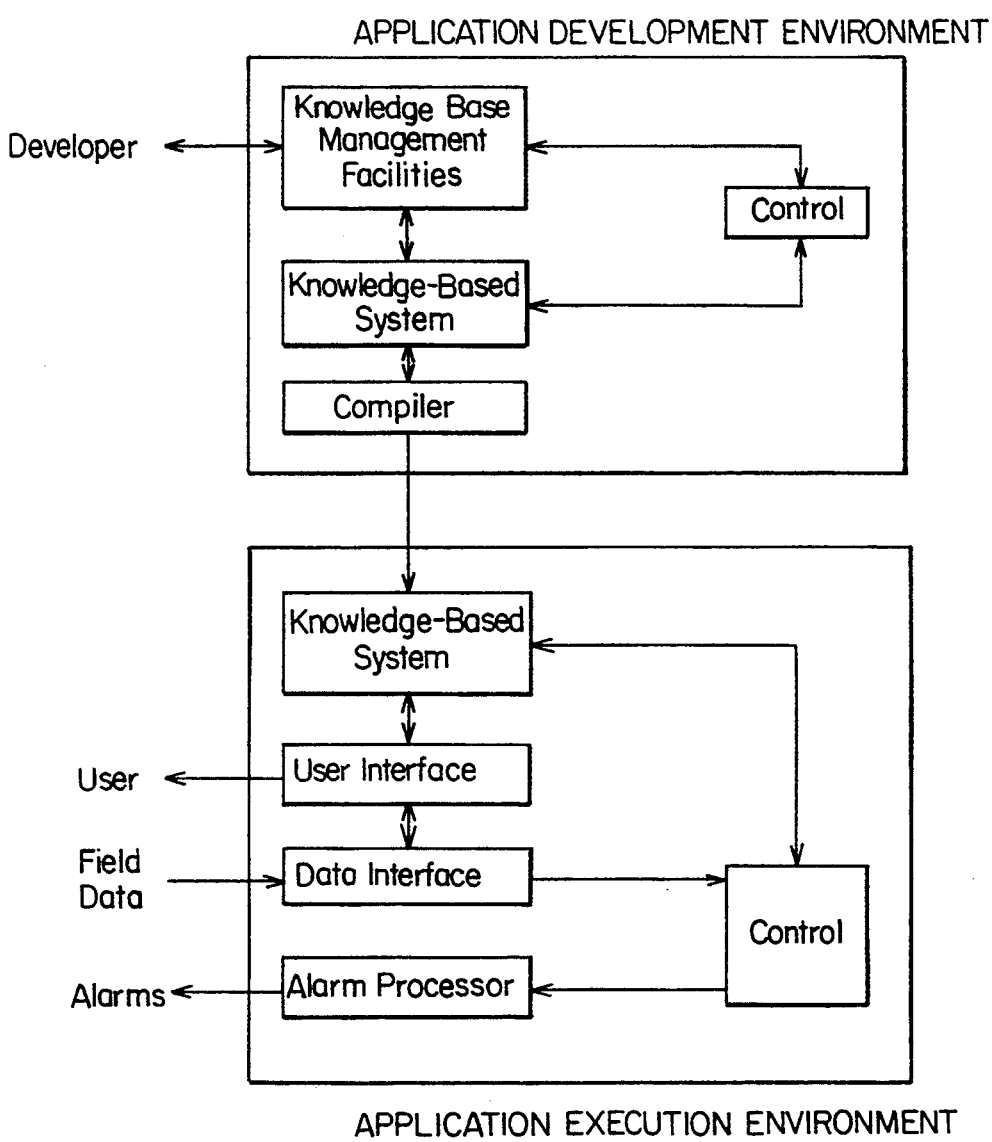
FIG. 2 is a detailed block diagram of the overall system environment of FIG. 1.

FIG. 2 is a more detailed view of the two environments. This shows the distinctions in the two environments. Note that the knowledge-based system framework resides in both environments. The link between these two systems is the compiler, which translates the entered information into a format suitable for real-time operation. Note that the "compilere" included as part of the APP. DEV. ENV. The knowledge-based system in the development environment is the system that is created by the developer, represented in a form that allows easy editing, manipulating and testing, while the knowledge-based system in the execution environment represents the runtime version of the system, having been modified for compactness and efficient execution. The domain shell specified here can be described in detail by examining these two environments.

The end users are the plant personnel who will use the system in the real-time plant environment. This view of the system emphasizes the details of the interface to the users, and describes the features that include the presentation of information, and the nature of the types of inputs that the user might enter.

The domain shell's architecture will be visible to the end user mainly in the manner of presentation of information. This includes the use of a windowing environment that allows the user access to different levels and types of information. The window environment should be held consistent so that all users maintain familiarity with the mechanics of operation within all parts of a particular application and also across applications.

The system will allow the end user to view the reasoning processes and to be provided with explanations of what the system is doing and why. It is important to maintain the explanation at a simple level, so that the plant operator is not overwhelmed by too much information when faced with the need to make a time-critical decision. However, the generality of the shell will allow the application developer to alter the runtime characteristics to optimize the appearance for the specific application.

Another major aspect of the external view is the ability of the user to direct the system to focus attention to certain aspects of plant operation. One example of this would be informing the system of aspects of planning so that the monitoring system can appropriately adjust its operation. This would occur, for example, if the operator knew of a scheduled shutdown of a part of the plant operation. The application will have the means of receiving this information and acting appropriately. Note that this type of action would have been "programmed" into the system during the application development phase. As implemented, it is only possible to specify this type of information by developing an external process (to the shell) that receives and Sends blockboard data that specifies this type of information.

One final aspect of the external view is the presentation of conclusions and recommendations produced by the system. Since these are time-critical, appropriate methods of presentation will be used. Once again, the domain shell will provide a selection of presentation methods; it will be the task of the application developer to choose the appropriate presentation.

After the application has been created for a particular plant environment, the system is then installed with appropriate interfaces established. The system is then set into operation in the runtime environment. This will involve the blackboard framework in operation with the contributing knowledge sources.

To facilitate the creation of an application, the domain shell will provide a set of what could be considered programmer tools. Editors to create and modify the blackboard structures will be implemented. These editors will guide the user in the development phase by ensuring that the structures are viable. Compilers will translate the information entered by the developer into a form suitable for execution in real-time. Development diagnostic tools will give the developer a means of checking the validity of his work before execution.

Because of the general nature of the domain shell, it is impossible to state the exact sequential nature of operation. This will be determined by the characteristics of the application as designed by its developer.

Figure 3:
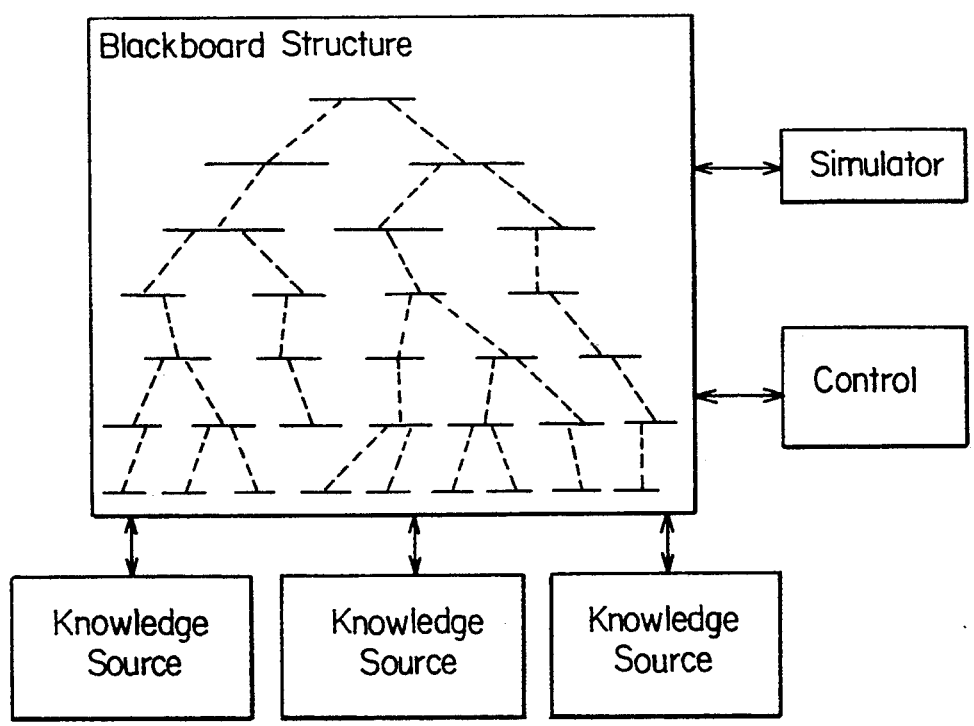
FIG. 3 is a block diagram of the blackboard architecture.

The internal view involves the description of the blackboard approach. This is the domain of the application developer, who must apply the tools in the domain shell to create the specific application. The internal structure is given in FIG. 3.

The blackboard structure contains data that is of relevance to one or more knowledge sources. Basically, it is a structure representing the state of the system. The developer creates a blackboard structure by organizing a hierarchy of information slots at different levels. Simply put, the highest level represents the broadest view of the plant, and each level beneath is a successively more detailed representation of a part of the plant. Note that the structure as created in the development environment must be augmented by actual and simulated data that is measured or derived during runtime.

The hierarchy of the blackboard is basically a partitioning of the understanding of the plant on different levels. For the plant environment, the partition that is most evident is the spatial and structural arrangement of equipment and processing areas in the factory itself. One can see the plant on a very abstract level, where raw materials enter a building at one end and finished products emerge at the other end. At lower levels, the processing can be seen to involve a series of steps or subprocesses, each of which can be represented on the blackboard. On the blackboard, parameters and variables of interest would be placed. These would be the parameters used by one or more of the knowledge sources.

The blackboard will hold this information. The domain shell will provide the blackboard structure components, and give the application developer the means of creating a blackboard framework specific to the plant. This framework will represent a model of the plant as the system understands it.

The knowledge sources are the particular segments which contain some form of reasoning about some part of the information in the model. Each knowledge source has its own domain, that is, the parts of the blackboard that it has knowledge about. A knowledge source interacts with the blackboard by initially recognizing that it "sees" something on the blackboard of interest. It then receives permission to alter some other section of the blackboard based on conclusions that it has reached. In this way, the state of the system (as seen on the blackboard) is updated and the overall system acts appropriately on the information in the blackboard. In the present application, however, the control process does the recognizing.

Each knowledge source in the blackboard system is responsible for recognizing the things that are important to it. In other words, each source should contain reasonable knowledge about its own domain of interest. In the domain shell, the application developer must have the information needed to integrate the knowledge sources into the system, and ensure that the knowledge source can interact with the blackboard. The knowledge source should provide the blackboard system with some indication of the urgency of its information.

The value of the blackboard approach is that different knowledge sources can apply their reasoning to overlapping parts of the blackboard. While the ability to overlap knowledge source domains introduces complexity, it is more valuable because it allows knowledge sources to fail without totally crippling the system. All major engineering systems provide for safety margins and backups, and the blackboard approach not only allows it but in effect encourages it by making sure that information is available to the knowledge sources that need it.

The simulator is a collection of mathematical and functional tools that can be used by the system. These tools include algebraic, difference and differential manipulations. These tools are not implemented as a distinct entity, though these tools do exist in parts of the domain shell.

The control is perhaps the most critical part of the blackboard approach. The control oversees the actual operation of the system. It is responsible for determining which knowledge source should access the blackboard, as well as prioritizing the operations of the knowledge sources. This portion of the blackboard structure will require the most thought, but will yield the most powerful performance if a well-designed control is developed.

A critical portion of the application development process will be determining an appropriate control hierarchy for the different knowledge sources. Even if the knowledge sources don't interact (their domains are mutually exclusive), the real-time nature of the domain shell requires that the system recognize the most urgent request first. For a complex application, different knowledge sources may have relevant information that could conflict. Thus, while the domain shell described here will provide a general set of tools for the application developer, it is vital that he develop a coherent problem solving strategy.

Because of the expected diversity of intended applications in the plant environment, the domain shell requires flexibility in knowledge representation, as well as the capability to adjust operation to the specific application. By use of the blackboard architecture, the desired flexibility is achieved while maintaining a foundation of standardized structure that can be the basis for expansion.

OVERALL SYSTEM DESIGN DESCRIPTION

This section describes the design of the shell at the operational level. It briefly discusses the system design concept and gives the modular decomposition of the shell. The system design is based on satisfying the requirements given elsewhere in this document.

Figure 4:
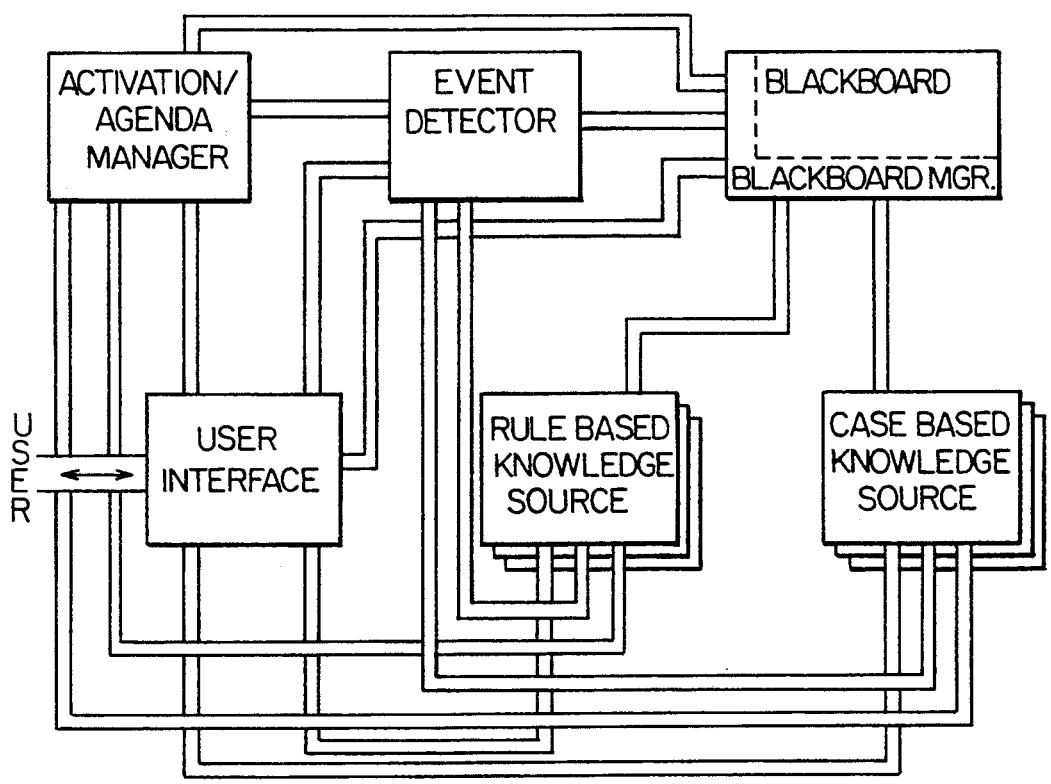
FIG. 4 is an overall system block diagram.

A block diagram view of the the domain shell is shown in FIG. 4. The system is divided into the following modules: the blackboard, the event detector, the activation/agenda manager, the rule-based knowledge source, the case-based knowledge source, and the user interface. Each of these modules represents a distinct UNIX process. Within the context of a specific application, there will exist one blackboard process, one event detector process, one activation/agenda manager process, and one user interface process. In addition, there must be at least one knowledge source process; multiple knowledge source processes are permitted.

Prior to the use of the shell, the user creates all the required input files. The required files are: the Blackboard Structure Description File (BSDF), one Rule-Base Description File (RBDF) for each rule base knowledge source, one Case Description File (CDF) for each case based knowledge source, and at least one Input Data File (IDF). The prototype software does not have editors; the app. developer creates these files outside the shell. In one embodiment, the shell will internally generate any description files.

While the shell checks the files for syntactical correctness, allowing the user to correct errors through a text editor, the shell does not scan the files for higher level errors or inconsistencies. Therefore, the user must ensure that the files contain consistent information or else the shell will generate unexpected results.

The shell is run by typing the program's name at the UNIX shell prompt, together with the system file name. The system (application) file name identifies a file that contains a list of files defining the structure of a particular application. The set of files determines the structure of the blackboard application; the BSDF and all RBDF's and CDF's related to the blackboard belong to the application. There is sufficient flexibility here to permit, for example, the creation of similar applications with perhaps one knowledge source removed. This allows the evaluation of the usefulness of a particular knowledge source to the application being tested.

After the system file has been given to the shell, the shell then begins loading the information. The shell starts the appropriate processes and supplies them with the name(s) of the appropriate file(s). This would include the blackboard process, the event detector process, the activation/agenda manager process, and the rule-based and case-based knowledge source processes. After all of the input files have been loaded, the shell is ready to initiate a session run of the application. In one embodiment, it asks the user to set the run parameters and specify the Input Data File (IDF). In another embodiment, IDF's are not used in the run-time environment. At this point the session run begins.

A session run of an application consists of the shell receiving input data, and taking appropriate action based on the data. The determination of appropriate action is the responsibility of the event detector process. Data values are updated on the blackboard and test conditions are evaluated to determine whether a knowledge source should be fired. If a knowledge source should be fired, then its name is placed on a First-In-First-Out (FIFO) queue to await execution. The present invention uses more sophisticated control including interruptibility.

The activation/agenda manager controls the execution sequence of the knowledge sources. It ensures that only one knowledge source is executed at a time.

Each knowledge source process used by the application contains appropriate structures relevant to its domain of expertise. During the shell's operation, each knowledge source pauses until activated by the activation/agenda manager. Upon awakening, the knowledge source executes its routines in an attempt to generate a diagnosis. When a knowledge source makes a diagnosis, it is written into a diagnostics file.

As a knowledge source executes, it requests data from the blackboard directly. Thus, all knowledge sources have direct read privileges with the blackboard. However, data updates to the blackboard generated by a knowledge source are directed through the event detector. The event detector can then scan the data to determine if an event has occurred.

The design decision to direct data updates through the event detector is an important one. The alternative is to allow each knowledge source to write directly to the blackboard. The advantage of direct writing is the efficiency of writing to the blackboard. The disadvantage is that the event detector must then continuously search the blackboard to determine if updated data is present. The shell's design, with indirect data updates from the knowledge sources, makes uniform all updates to the blackboard, whether from sensors or from knowledge sources. Conceptually, this is a simplification for the event detector, which has other difficult tasks to perform. If the event detector had to search the blackboard continuously, it would represent a fundamental conceptual shift in the blackboard operation from an asynchronous, data-driven process (as originally envisioned) to a mixed combination of asynchronous processes and systematic searches.

The sequence of reading input data, firing knowledge sources and generating diagnoses continues until the user specifies to the shell to stop only for prototype. At this point, an ordered list of the diagnoses, the Diagnostics File (DF), is generated.

DESCRIPTION OF PROCESSES

This section describes in more detail each of the processes involved in the execution of the shell. Each process is described in terms of four entities: a brief summary of its purpose, the process name, data structures, and the logical flow of the program. The data structures and logical flow entities are augmented by programming guidelines wherever necessary. The input/output relationships are described hereinafter. It should be noted that the level of detail in this section is such as to guarantee proper operation of the overall software. Thus, programmers are constrained by the information contained here. For example, the data structures described in subsequent sections are implemented as described here; programmers are free to use any other structures that also might be required for the proper operation of a module.

The Blackboard

The blackboard process incorporates the blackboard objects and the methods necessary to manipulate the objects. Process name: blackboard Data structures: FIG. 5 shows the basic organization of the data structures which represent the blackboard objects. The structure on the left is an array which implements a hash table. On the right, linked lists store the attribute/value pairs.

Programming guidelines:

The hash table is implemented using Brent's variation of the open addressing with double hashing algorithm. The size of the hash table starts out at a large number, but not excessive. For example, 503. If the number of objects causes the table loading factor to exceed approximately 85%, a new, larger table is allocated, and the data is rehashed. The maximum hash table size is 43,391 or larger.

The hash table key is the object name, and the table entry is a pointer to an object structure, which also contains the name of the object (pointer to a string). Upon retrieval, the key and the name string are always compared. Accessing an object/attribute is also possible by using the index of the object in the hash array, and the index of the attribute in the list. This provides a fast access mechanism during runtime, if such indices are known by the entities requesting the access.

Attribute structures include a demon slot, optionally referencing a function. If present, the function is executed each time the attribute receives new value(s).

Value structures contain a "type" slot. FIG. 6 shows the type codes.

Value structures contain a "time stamp" slot, in seconds. Insertion in the list is such that most recent values are first.

Insertion in the value list is done such that there is always one, and only one value older than current the time stamp minus the history length. All other, older values are discarded.

Logic flow:

The blackboard manager performs several functions. First, after the process is started, it creates the blackboard structures from information contained in the file whose name is passed on to it. Then, it receives messages which request getting or putting data on the blackboard. Each message is acknowledged by one of the following: a data message, if a successful "get" took place, an ACK message, if a successful "put" took place, or a NACk message, if an error is found. A STOP message from the user interface tells the software to write out the blackboard structures and exit. A RESET message causes the blackboard to clear all its data contents, but not its structure of objects/attributes. This module can be written in a structured programming language such as ANSI C.

The Event Detector

This process receives data from external sources, it also receives the data that knowledge sources want to write on the blackboard. All incoming data is sent to the blackboard process. Every piece of incoming data is also checked for potential detection of an event. An event may be triggered by the value of data, i.e., by satisfying an expression, or by the simple arrival of a data point, regardless of its value. Timer based events are handled by the activation/agenda manager process. A list of knowledge sources associated with detected events is sent to the activation/agenda manager process.

Process name: event detector

Data structures: FIG. 7 shows the data structures required by this process. On the left, an array implements a hash table. Each data source, be it sensor (external) data, or knowledge source generated, has an entry in the hash table, which points to a data point structure. Each data point then has an associated indirect expression list. The elements of this list point to entries in the expression list, which in turn, has pointers to the expression arrays.

Programming guidelines:

The hash table is implemented using a simple, double hashing algorithm. Since the event detector is a potential bottle neck, the highest possible performance should be sought. The separate chaining algorithm, perhaps with ordered lists, or even Brent's variation are alternative hashing algorithms that could be used.

The size of the hash table is expected to be smaller than the blackboard table. It also starts at 503, and more space is allocated if the loading factor exceeds 90%.

The hash table key is the concatenation of the object and attribute names. The table entries point to data structures which also contain the object/attribute names. The names are always compared during retrieval.

Logic flow: FIG. 8 shows a simplified representation of the program's logic. The initialize part is executed when the process is started: it creates the structures shown in FIG. 7, by loading and parsing the event expression definitions from the knowledge source description files whose names are passed to it as arguments. The remainder of the program is driven by the receiving of messages.

Programming guidelines:

All incoming data messages are acknowledged by a NACk message if a syntax error is found, or by forwarding the blackboard acknowledgment message back to the original sender otherwise.

An expression evaluator is described elsewhere. Event defining expressions are similar to evidence expressions, hence the same software is used.

The operators used in expressions are essentially the same as operators used elsewhere in the system. Thus, in order to differentiate between newly arrived values, and older values, available from the blackboard, the new operator is required to precede object/attributes which trigger on arrival of new data.

If there are no expressions associated with a knowledge source, such knowledge source will only fire if one of its preconditions include the every operator. This module can be written in C++, since it has object-oriented features.

The Activation/Agenda Manager

This process starts the execution of a knowledge source. The knowledge sources activated by the event detector are started immediately, if and only if their preconditions evaluate to TRUE. If no preconditions are defined for a knowledge source, it will fire at the next opportunity. A priority scheme determines execution order. A separate queue is kept for knowledge sources that execute periodically.

Process name: a manager

Data structures: There are three basic data structures required by this process: (a priority scheme for activation of event driven knowledge sources), a time-based queue for periodic knowledge sources, and a knowledge source/precondition expression structure for checking preconditions. The latter is conceptually identical to the event detector data structures, as shown in FIG. 7, with the following differences: a hash table is not required at this time, a simple array of size 100 will suffice; an expression list for each knowledge source is pointed to by the array elements; hence, the object/attribute structures and the indirect expression lists are not needed; the "knowledge source" and "updated" slots in the expression list structures are also not needed.

Logic flow: Although it is basically one process, the software that implements the activation/agenda manager is best thought of as two interrupt driven programs. One reacts to the arrival of a message from the event detector, as shown at the top of FIG. 9. The other reacts to the passing of time, as shown at the bottom of FIG. 9.

Programming note: Although this process is best thought of as two interrupt driven programs, the actual implementation approach is at the implementer's discretion. This module can be written in C++.

Rule Based Knowledge Sources

This process implements a basic data-driven (forward chaining) inference mechanism operating on a set of IF . . . THEN . . . rules, with propagation of belief.

Process name: rule based Data structures: The basic data structure is the rule network (tree). An example is shown in FIG. 10. The network nodes exist in three fundamental layers: the input layer, consisting of data nodes, the intermediate layer, consisting of hypothesis, variable and constant nodes, and the output layer, consisting of malfunction nodes. Their structures are shown in FIG. 11. The data and malfunction nodes must have blackboard equivalents. The other node types (hypotheses, variables and constants) may, but are not required to. The supporting- and supported-rules slots contain pointers to structures which describe the way nodes are inter-related. These structures are the rules, and their basic organization is shown in FIG. 12. Also shown in this figure is the structure of meta-rules.

In addition to these structures, FIG. 13 shows the organization of several other entities which are required for the implementation of the features described in the functional specification. Some of these are further discussed. Lastly, a structure is needed to store evidence expressions.

Logic flow: The program first reads the rule base description file and creates the structures described above. Then, it waits for a message. If it is a SET-PARAM type message, then the program sets or resets the trace, log and step run parameter, or it changes the value of the global sufficiency and necessity factors, or it changes the values of the global alpha and beta cut-offs. For setting breakpoints, the rule based knowledge source's own user interface is invoked. If the message is a RESET type message, then the program resets itself, in preparation for a new session run. If the message is an ACTIV type message, the program generally follows the steps shown in FIG. 14. The logical flow shown in this figure is greatly simplified. Critical aspects of the software are further elaborated in the following sections.

EVIDENCE EXPRESSIONS

As shown in FIG. 14, before a rule can fire, certain conditions must be met:
1. The rule's context must evaluate to TRUE,
2. The rule's evidence is available, and
3. The value of the evidence contribution towards the rule's hypothesis must be within the range defined by the alpha and beta cutoff values.

These conditions are dependent on expression evaluation. The general strategy for handling expressions is as follows. An expression is initially specified in a rule base description file using a prefix or infix notation. A few examples:

"if the temperature went from below to above 500 degrees in the past hour":

((time-when(temp>500))<3600)

"if the change in pressure over the last 2 hours was less than 0.5":

(<(trend pres 7200)0.5)

"if hypothesis #1 is TRUE AND at least one of the following is TRUE: hypothesis #2 is TRUE OR hypothesis #3 is TRUE OR hypothesis #4 is FALSE":

(hyp1 and (or hyp2 hyp3(not hyp4)))

The text is stored as a string in the evidence-text slot of the rule, for simple display purposes. It is also parsed into an expression-array. The structure of this array is a strict prefix, recursive representation of the expression, where the operators have been replaced by their corresponding tokens (or pointers to functions), and the operands are replaced with pointers to the structures holding the dynamic values, or with the values themselves, if they are static constants.

In the last example, the numbers 2 and 3 indicate the number of operands following the token. A pointer to this array is placed in the evidence-expression slot of the rule. The parser also generates a separate evidence-list containing only the operands which are pointers. This list is used for quick checking of the availability of the evidence.

Runtime evaluation of the expression then consists of recursively calling a simple evaluation function which performs the actual calculation.

The conditions for firing a rule are then checked as follows:
1. Evaluate the rule's context expression. If TRUE (i.e., value evaluates to 1),
2. Check if ALL the evidence components on the evidence-list have been updated. If yes,
3. Evaluate the rule's evidence expression. This returns a confidence level, CF evidence. This value, combined with the rule's sufficiency or necessity (as described in the next section) determine the rule's contribution to the belief in the rule's hypothesis. If the contribution affects the hypothesis MB, and the contribution amount (value) is greater than the alpha cutoff value, OR if it affects the hypothesis MD, and the contribution amount is less than the beta cutoff value, then the rule can fire.

Operands can be of several types:

Value operands evaluate to a number. Value operands can be specified by an actual number, the name of a node, the name of a context, or an expression which itself evaluates to a value. If a name is used, then the value used in calculations depends on the type of structure:
  hypothesis and malfunction nodes supply their CF slot value
  data, variable and constant nodes, and contexts supply the contents of their value slot.

CF operands are like value operands, except that the value must be a number between −1.0 and +1.0.

Piece-wise-linear operands are the name of a piece-wise-linear structure, which supplies a list of X-Y pairs for data interpolation.

Operators are also of various types:

Algebraic operators always return numerical values, and all of their arguments are values. A list of these operators is given elsewhere. In addition a curren-t_time operator is provided, which returns the time stamp of the current set of data.

Boolean operators always return a CF value. Their operand types however differ:
  fuzzy booleans (and, or, not) require CF type operands.
  weighted booleans (weighted-and, weighted-or) require (weight, CF) pairs, where the weight is a number.
  comparative booleans (equal, less, greater) take two value arguments, and an optional piece-wise-linear. If the latter is not specified, the operators return +1 or −1 (TRUE or FALSE). Otherwise, a fuzzy result is calculated by mapping the difference of the two numeric arguments on the x-axis of the piece-wise linear function, and returning the corresponding y-axis value.

Time-based operators always return a numerical value. Their operands are a node name and a value (delta T). The second argument must be an actual numerical value. A list of time based operators is given elsewhere. In addition, two more operators are added: a time value operator, which returns a value from the node's history, and a time stamp operator, which returns the time stamp of a data node (not necessarily the same as current time).

Change-based operators always return a value. The time when operator requires one expression as an argument. When the truth value of the expression goes from FALSE (less than zero) to TRUE (positive value), the time of the transition is recorded. Hence, the expression should be a CF type. The value when operator takes two arguments: a CF expression and a node name. When the expression goes from FALSE to TRUE, the value of the node is remembered. Both of these operators accept an additional argument, used to define the transition from FALSE to TRUE. If this optional argument is missing, the boundary between TRUE and FALSE is the global alpha cutoff value.

Other notes:

When expressions are used as a rule's evidence, they must evaluate to a CF type. In other words, the top level operators must be of boolean type. In all other circumstances (such as meta-rules and calculations stored in variable nodes) there are no restrictions.

All node references in expressions which include time based operators must have corresponding object/attribute entities in the blackboard, where the actual histories are kept. When the reference is in a rule's evidence, then the name of the node should be used; when it is in an event or precondition definition, the object/attribute names have to be used.

Only one change-based operator is allowed per rule.

All time references are in seconds. All time intervals are measured from the current time stamp (not necessarily the same as the current real time).

Some operators have "aliases": add +; and &; diff −; div /; equal =; greater >; less <; not !; or ?; and times *. These operators can be used (either their names, or their aliases) in both infix or prefix notation. All other operators can be used in prefix notation only.

The number of arguments is generally implied by the nature of the operator. Some operators however can take any number of operands: and, or, average, diff, div, max, min, std-dev and times.

Inference Mechanism

Propagation of belief. This is done in three steps:
1. Evaluation of a rule's evidence. This has been discussed in the previous section. Also, see elsewhere, for combining formulas of boolean evidence.
2. Calculating the rule's contribution. Rules have a priori defined confidence levels, named sufficiency and necessity (SF and NF). The table in FIG. 15 gives the complete algorithm. Note: this contribution is used in the determination of the alpha-beta cutoff.
3. Updating a hypothesis' belief. When more than one rule affects a hypothesis, the union probability rule is used:

$$Beliefi = Belief_{i-1} + Belief_{rule-i} - Belief_{i-1}*$$

Belief$_{rule-i}$, where Beliefi is the hypothesis' MB or MD, as indicated in FIG. 15, and Beliefrule—i is the contribution of the with rule, as indicated in FIG. 15.

Data nodes. The input into the system is in the value slot of the data nodes. These values are generally converted to beliefs by use of comparative booleans.

Meta-rules. These rules do not propagate belief, but are used to change the context and to modify the importance of rules. The target-list slot of a meta-rule (see FIG. 12) therefore points to context or rule structures. In the first case, the target-slot slot of the meta-rule is assumed to be the value slot of the context structure; in the second case, the SF or NF slots of the target rule must be specified. The source slot of a meta rule contains an expression. The value obtained by its evaluation is passed on as an argument to the optional function slot (a piece-wise-linear function), and the result is placed in the target-slot of the target contexts or rules. If a function slot is not defined, then the result of evaluating the expression is placed directly in the destination (target-slot).

When a meta-rule changes the context, all the rules that have already fired, and whose context changed, are "unfired" (i.e., their effects are removed). The program then re-checks rules that couldn't fire before the context change, for the possibility that they are in context now. Similarly, when a meta-rule changes the SF or NF of a rule, all effects of this rule must be undone, and the rule fired again.

Two observations about meta-rules: first, they can cause infinite loops, due to the un-firing and re-firing process. Thus, each meta-rule has an optional associated counter, which only allows a predefined number of executions of the meta-rule. If a counter is not defined, it is assumed to be 1. Second observation: meta-rules must be used with caution, since they not only are difficult to use conceptually, but they also greatly reduce runtime performance.

Evaluators. Although similar to rules, the purpose of the evaluators is not to propagate belief, but rather to perform calculations. Thus, an =evaluator structure (FIG. 13), has a context expression, just like a rule. It's expression slot is evaluated, just like a rule's evidence. The result of this evaluation is then placed in the value slot of the variable whose name is in the variable slot.

Debugging. Eight run parameters can be set:
    trace: when set, it causes a detailed descriptive message to be displayed on the screen by each rule, when it fires.
    log: exactly like trace, but output goes to a file with the extension ".log"
    step: when set, the program stops after each rule firing, and continues only when requested by the user
    breakpoints: associated with rules, they cause the program to stop just after the marked rule fired
    global SF and NF: they define default values for these two parameters (i.e., if a rule is defined without an SF and/or NF value, then the global defaults are used.)
    global ALPHA and BETA: they define default values for these two parameters (i.e., if a rule is defined without an ALPHA and/or BETA value, then the global defaults are used.) The global ALPHA is also used to define the default transition from FALSE to TRUE for change-based operators, if not specified within the expression.

All these parameters, except for breakpoints, can be set and cleared by SETPARAM messages from the user interface. The breakpoints are set by the rule-based knowledge source software, via its own user interface:

User interface. The program's own user interface is invoked in one of two circumstances: when the user wants to set breakpoints, and during runtime, if the step parameter is set, or a breakpoint is encountered. The program's user interface allows the user to perform a minimum amount of browsing through the rule base (e.g., list structures). The system structure shown in FIG. 13 stores the appropriate bookkeeping information for this purpose.

Output. Besides the log files, the program writes a diagnostic file, where the top malfunctions are listed. This output file has the extension ".out"

Actions. Several actions for the right hand side of a rule are provided:
    Put value in bb. This action takes one argument, a node name. If the rule having this action fires, the value of the node argument will be sent to the blackboard. Note that a malfunction's value is sent to the blackboard automatically.
    Assign. This action takes two arguments, first a variable name, second, a node name. The value of the second argument is placed in the value slot of the variable node.
    Show. This action takes no arguments. When the rule fires, information similar to that displayed by the trace parameter is shown on the screen. This action is useful if a rule needs to be monitored, but without stopping the run (as a breakpoint would do), and without displaying information about other parts of the rule base.
    Performance. The program will record its starting and stopping times, as well as the number of rules fired and unfired. Blackboard access times are also recorded. This module can be written in C++.

Class Based Knowledge Sources

This process calculates a similarity value for each case stored in its case tables, by comparing each case with the current data.

Process name: case based

Figure 16:
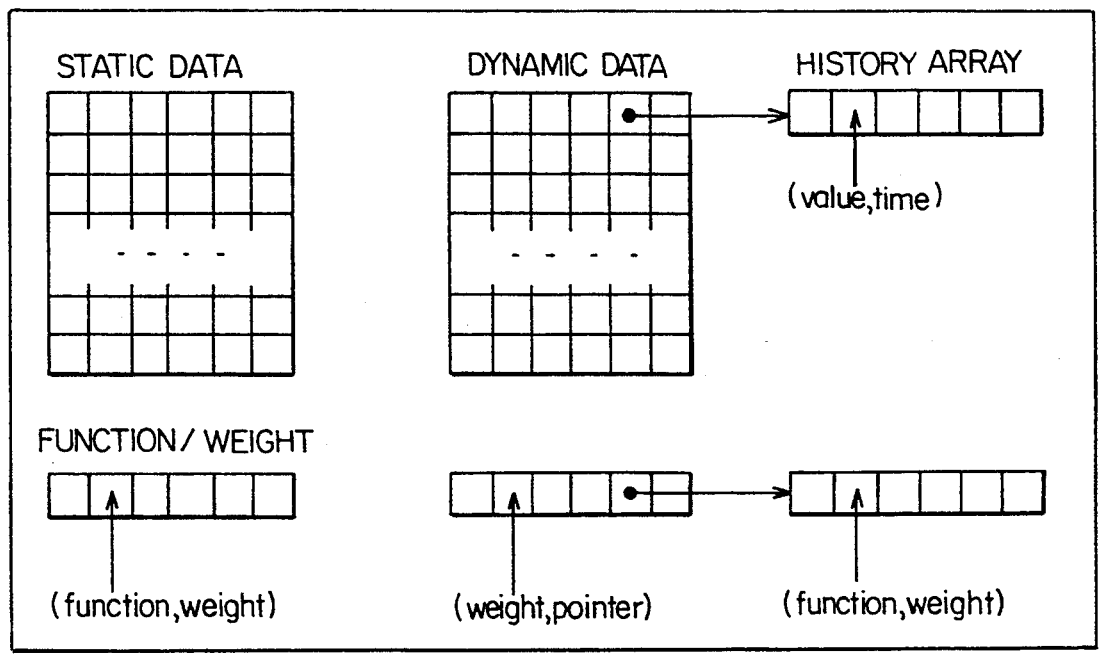
FIG. 16 is a diagram of case-based knowledge source data structures.

Data structures: FIG. 16, shows the information that is represented in a case table. The case-based process represents the data in the table in two separate structures, as shown in FIG. 16: a static data array, and a dynamic data array, for the time-dependent data. The static data array is simply an array of floating point numbers (doubles). The dynamic data array is an array of pointers, where each cell points to a history array. Each cell of the history array, in turn, contains a value/time pair. In addition to the data arrays, two other structures are needed, to store the function/weight information. One such structure corresponds to the static data array, and it is itself an array of function/weight pairs. The other structure corresponds to the dynamic data array, and it consists of weight/pointer pairs. The weights are used for the result of matching the time dependent data; the pointers point to another array, which consists of function/weight pairs. In addition to these structure, a summary array is used to keep the final score of each case, together with the name and attribute of the blackboard object to which the case corresponds, and a description of the case.

Logic flow: The program has two parts. First the structures described above are initialized (loaded) from a case description file. Then, whenever the process is activated, the current data is compared to the data in the structures, and scored according to formulas.

Programming guidelines:

There are four functions f used for scoring: equal, less than, greater than and match-points-on-curve. The latter function translates into equals and weights of 1 in the function/weight array. Since all values are floating point numbers (doubles), the equal function is defined to be TRUE whenever the two values are within some small percentage of each other (e.g., 1%). This is true in all similar cases.

The results of applying the functions range from 0 to 1. Interpolation is performed between user defined points.

Aside from all of the above, a criterion is needed for when to place a similarity score back on the blackboard. For example, whenever the score is greater than a predefined percentage of the maximum possible score for a case. The maximum score would then be calculated once, and stored in the summary array. In this implementation, the scores are always written back into the blackboard.

An output file is written at the end of each activation session, as described elsewhere.

THE USER INTERFACE

This module generally performs two functions essential to the operation of the software. It is the principal means by which the user interacts with the system. It also acts as a "supplier" of data during the execution of the diagnostics.

Process name: user int

Data structures: FIG. 17 shows a general data structure that could be used to store the input data. This linked list is created from the contents of one data file, and it is used to supply the data to the event detector at the appropriate times, as determined by the time tags. Note that, at this time, the data values are of one type only (double); other data types may have to be added in the future. The use of this structure is optional.

Logic flow: FIG. 18 illustrates the sequence of operations that makes up this program. There are three parts to this process.

First, the names of files in which the descriptions of the blackboard and of the knowledge sources are determined. The names of these files are kept in a system file, which has the name <system name>.SYS. The name of this file can be passed as an argument to the program:

user int<system name>.sys

Next, the other processes are started. First, the blackboard process, then the control processes (event detector and activation/agenda manager), followed by the knowledge sources.

After the system has been loaded, the actual execution of the diagnostics is started. First the user has the option to set run parameters: tracing, logging, stepping and breakpoints can be set or turned off; SF's, NF's, alpha and beta values can be set. Then the user is asked for the name of a data file. At this point the user may, in general, specify a time scale factor, which is used to "compress" or "expand" the time scale, such that data sets are run faster or slower than real time. The data sets are then supplied to the event detector, one at a time, until there are no more sets. The setting of the run parameters and and the execution of the diagnostics is then repeated as long as the user wants to.

Programming guidelines:

After starting a process, the user interface waits until the process acknowledges the correct loading of its file(s). If an error occurs, a NACk message is expected. This message includes an error message, which is displayed. In this case, the user has the option to repeat loading the file with the error, after it is fixed in a different UNIX shell.

The displaying of error messages due to syntax problems in files is the responsibility of both the loading process and of the user interface. The setting of the trace, log and step run parameters is done from the user interface, via messages to the knowledge source(s). The setting of breakpoints however, requires passing control over to a rule-based knowledge source.

Before asking the user for a time compression factor, the program may display the time required to run the diagnostics in real time, based on the difference between the last and the first time stamps in the data file. The time compression must be done such that the data sets do not become overlapping as the interval between them becomes smaller than the available time resolution.

INTERFACE DESCRIPTION

This section provides the details of the interfaces between the modules. It also contains message format descriptions and file syntax structure for the shell's input and output files.

Figure 19:
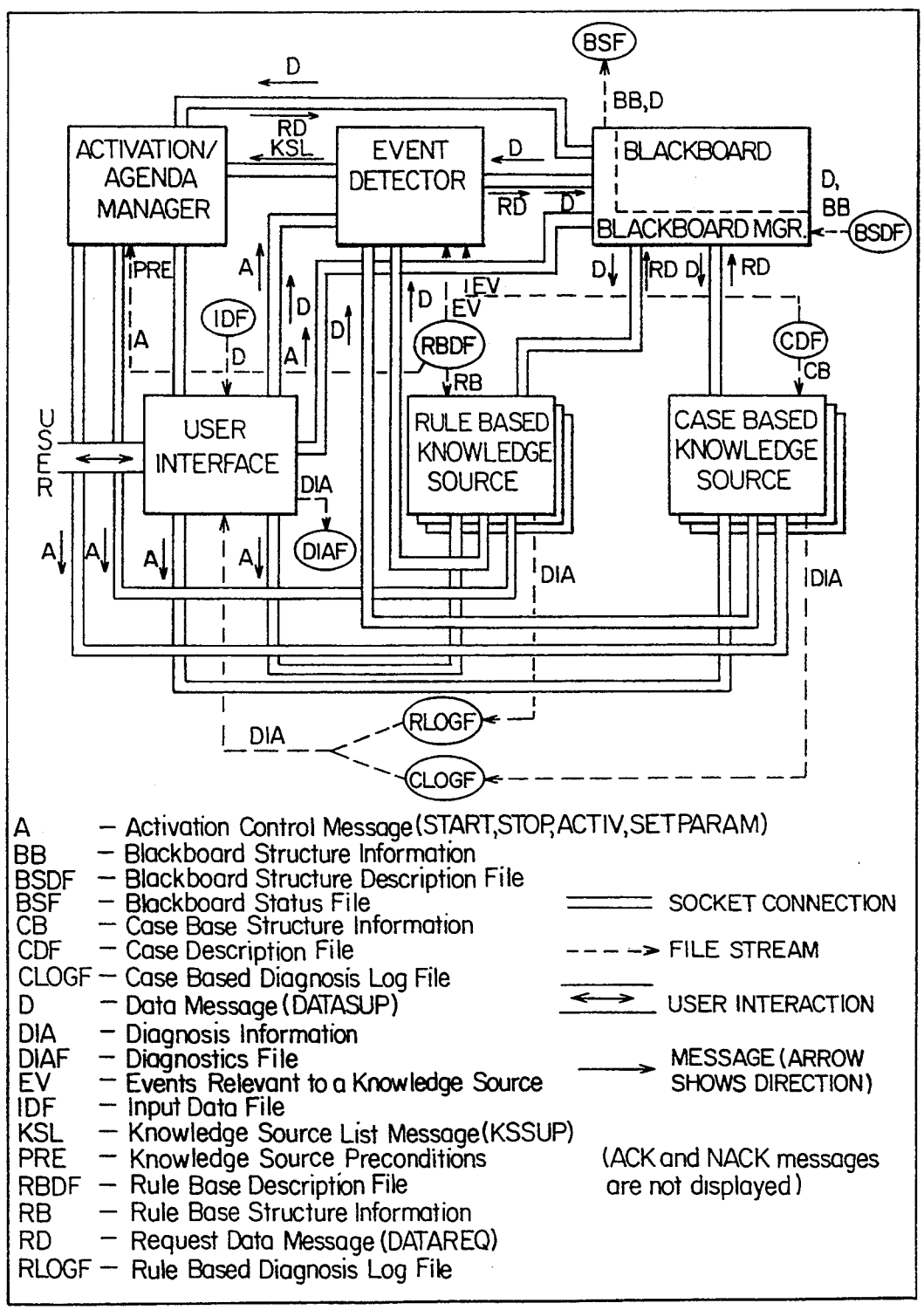
FIG. 19 is a detailed system block diagram.

FIG. 19 is a detailed picture of the system block diagram. It shows the socket connections, the message paths, and the I/O files (Section 4.3) that are required for the shell. The man-machine interface and its connections are not shown in FIG. 19. However, its interface requirements are described in this section. Message queues are also used for communications. Message queues are a standard feature of the UNIX operating system on HP computers. The manner of usage is similar to that for sockets; in other words, the description given here for communications applies also to message queues.

COMMUNICATIONS

Interprocess communication between modules in the shell is based on either the use of Berkeley Interprocess Communication (BSD IPC) Sockets or UNIX Message queues. Either of these modes provides a means of message passing so that data can be transferred between two processes.

The socket mechanism provides a related series of operations through Internet domain sockets. Compatibility between the two domains exists on a function to function basis.

For socket communications, the shell uses stream sockets since these provide reliable, two-way communication. Communication through the channel is analogous to that for UNIX pipes (file streams). The shell uses the sockets to exchange messages in a message sequence. The message sequence is essentially a request-response pair. The initiating process requests an action; the receiver then responds with either the results of the action, an acknowledgment of success, or a notification of failure.

Throughout this section it is assumed that the request messages are free from errors. However, processes will respond to an error in a message with a notification of failure (NACk) message if they are able to detect the error before a response is needed.

For the shell, all required communication channels are established before a session run begins. When the shell is started, each of the six process types described elsewhere is started (user interface, blackboard, event detector, activation/agenda manager, prototype only and rule based knowledge source, and/or case based knowledge source). A sequence of communication establishment then begins.

In its initialization, the user interface process establishes a bound socket with a listen queue. When the event detector, blackboard, and activation/agenda manager processes are started, they each request a socket connection with the user interface. Three channels are established in this manner. The blackboard, event detector and activation/agenda manager each establish their own bound sockets with a listen queue. Four additional channels are established: the event detector-blackboard channel, the event detector-activation/agenda manager channel, the activation/agenda manager-blackboard channel, and the blackboard-man-machine interface channel.

Additional channels are established as the application's knowledge sources are spawned from the parent knowledge source process. For each knowledge source, communications are established with the event detector, the blackboard and the activation/agenda manager.

There are two distinct uses of the connections within the shell. The first use is data-oriented, being involved in requesting and supplying application data for transfer between modules. The second use is control-oriented. This entails the activation of processes and changes in the modes of process operation. However, the type of communication established is independent of the use. Activities of either type of use are permitted. The content of the message determines the usage. The distinction is made in this document to efficiently categorize the design information presented herein. Only one communications channel normally uses both data-oriented and control-oriented message sequences. This is the event detector-user interface channel. The data-related communication channels carry five distinct message types. They are shown in FIG. 20. The syntactical format of the message streams corresponding to these five message types are described hereinafter.

A further distinction of the DATASUP message type is possible between data headed for the blackboard and data coming from the blackboard. This distinction can be made on contextual information (i.e. which process is sending the data). However, it is not necessary to have a distinct message format specified, since the content of the message is similar for both DATASUP messages. This socket channel is established as part of the initialization of the shell processes prior to a session run.

One task of the user interface is to supply the data input to the event detector. Data is supplied to the domain shell either from an input data file, used to simulate "real" data, or a UNIX process external to the shell that sends "real" data. The event detector responds to the message in one of two ways. If a syntax error is found, then the event detector returns a NACk message. Otherwise, the event detector relays the DATASUP message to the blackboard. This channel also carries control-oriented messages. These messages are discussed herein.

The event-detector agenda/activation manager channel is established when the event detector and agenda/activation manager are initializing. The connection must be established prior to the beginning of the application session run (when the input data is read). The channel is used to deliver the list of knowledge sources to be activated from the event detector to the activation/agenda manager. The event detector passes a KSSUP message that contains the list of knowledge sources. The agenda/activation manager responds with an ACK message to indicate that a correct message was received. The event detector balckboard socket channel is established when the event detector and the blackboard are initializing. The connection must be established prior to the beginning of the application session run.

The channel delivers the data updates to the blackboard, and also provides a two-way channel for the event detector to request data from the blackboard, and the blackboard to deliver the data. There are two message sequences that pass through this channel. One message sequence is the event detector furnishing data to be updated on the blackboard with a DATASUP message. The blackboard will acknowledge receipt of a correct DATASUP message with an ACK. The other message sequence is that of the event detector requesting data from the blackboard with a DATAREQ, and the blackboard supplying the data with a DATASUP.

The activation/agenda manager-blackboard channel functions in an identical manner to the event detector-blackboard connection, except that there is only one message sequence. This is the DATAREQ-DATASUP sequence as described in the previous section. The implementation requirements for this channel are identical to those for the event detector-blackboard. See the previous section for details.

One channel is established for each knowledge source in the application. At this point, the required number of knowledge source processes is known by the shell. When each spawned knowledge source process is being initialized, it requests a connection with the blackboard.

One message sequence type is used on the knowledge source-blackboard channel. This is the DATAREQ-DATASUP sequence as described for the event detector-blackboard channel. Here, the knowledge source is the requester of the data, and the blackboard is the supplier of the data.

Each knowledge source has a connection with the event detector. The connection is established when the knowledge source is being initialized.

The message sequence on this channel is the DATASUP-ACK sequence as described for the event detector-user interface channel. The event detector responds to the DATASUP message from the knowledge source by sending an ACK message to the data-supplying knowledge source.

The shell uses a process starter that is responsible for starting and terminating the other shell processes.

There are six control-oriented message types. They are shown is FIG. 21.

The syntactical formats of the message streams corresponding to these message types are described herein.

The event detector-process starter channel is established during the initialization of the shell processes prior to an application session run.

The process starter is responsible for controlling the event detector process. The user interface sends an appropriate control message to the event detector. The process starter sends an appropriate control message with an ACK message if the message is correct.

The process starter a/a manager channel is established during the initialization of the shell processes prior to an application session run.

As in the previous section, the process starter a/a manage channel is used by the user interface to communicate appropriate control messages to the activation-/agenda manager.

The process started-blackboard socket channel is established during the initialization of the shell processes prior to an application session run.

Again, this channel is used by the user interface for controlling the blackboard as described for the user interface-event detector channel.

The process starter knowledge source channel is established when the knowledge source is initializing after it has been spawned.

The user interface must be able to shut down a knowledge source process when desired with a STOP message. This is one use of the channel. Another use is when the user desires to set operating parameters for a knowledge source. The user interface then sends a SETPARAM message to the knowledge source, communicating the desired operating mode.

The a/a manager-knowledge source channel is established when the knowledge source is initializing after it has been spawned.

The purpose of this channel is to allow the activation-/agenda manager to activate a knowledge source when it is time for that knowledge source to begin reasoning. It sends an ACTIV message to the appropriate knowledge source to inform it that it should begin active operation to produce a diagnosis.

A control message is also sent from the knowledge source to the activation/agenda manager when the knowledge source has completed executing. This allows the agenda manager to update the status record for the knowledge source.

MESSAGES

There are nine distinct messages that pass through the communication paths. All messages are headed by an integer code, which identifies the type of message that follows. FIG. 22 shows a typical integer code for each message. Actual implementation codes include additional information to source and destination process.

The whitespace characters shown in the figures for the message formats are present for clarity. The actual data message formats include the size of the message and should also be efficiently aligned.

DATAREQ

This message contains a sequence of object attributes whose values are requested. FIG. 23 shows the message format. The message begins with the DATAREQ identifier, followed by the number of objects whose attribute data is requested. Each object name and attribute name is then listed.

DATASUP

This message contains a sequence of object attributes with values and time stamps for the attributes. FIG. 24 shows the message format. The format is similar to that of the DATAREQ message except that the attribute values and times are also present.

KSSUP

This message contains a sequence of knowledge source identifiers to be activated. It is headed by the KSSUP identifier. FIG. 25 shows the message format. The message is headed with the KSSUP identifier, followed by a sequence of knowledge source identifiers. The knowledge source identifier is a unique handle for the application, determined by the order of appearance of the knowledge source file name in the the system file. Note that UNIX process numbers are not recommended as handles.

ACK

This message consists solely of ACK identifier code returned to the communication initiating process.

NACK

This message consists of an integer NACK identifier code.

START

This message consists of a START identifier, followed by a character string. The character string provides the means of passing information to another process. If the processing sending the string is ready to start, then it sends the strink "OK" to the user interface. Otherwise, it should send an error message, to be displayed by the user interface.

STOP

This message consists of a STOP identifier.

ACTIV

This message consists of a ACTIV identifier.

SETPARAM

This message consists of a SETPARAM identifier, followed by a list of arguments (character string). The arguments will specify to the receiving process what particular parameter setting action to take. FIG. 23 shows the structure of the message. There are six types of parameter codes. They are: trace, log, step, breakpoint, alpha/beta and sf/nf. Trace, log and step are followed in the message with a status code. Alpha/beta and sf/nf are followed by two numbers representing floats that are the first and second parameter values. Breakpoint requires the user to interact with the receiving process to set breakpoints.

INPUT/OUTPUT FILES

All files used by the shell are identified by type by the use of a particular suffix. The filename is filename.suffix, where filename is a descriptive name supplied by the application developer, and suffix identifies the file type. Suffix identifiers are specified in the appropriate sections below. In general, suffixes can be in lower or upper case.

Input files are created outside of the shell, then supplied to the shell through specification of a system file.

The application development editors automatically create these files; the developer need not edit them outside the shell, and in fact may compromise the application if this is done. The following conventions are used in the figures showing the syntax of input files in this section. Upright text (such as FUNCTION:) must appear exactly as shown. Italic text (such as object_name_1) denotes information that the user must supply. Text in the current text font is explanatory information and does not appear in the actual file. Elements of a file that are optional are enclosed in < >. Generally, the order in which elements appear in files is important, and must be the same as shown here.

All whitespace characters (spaces, tabs, end-of-lines) can be expanded for clarity. Separation of entry elements by end-of-lines is recommended to make the file more readable. Comments can be inserted at any point in the file using the // comment-to-end-of-line format from the C++ language. . Lastly, all references to timestamps require the following syntax:

"mm/dd/yyyy hh:mm:ss"

This file, identified as filename.sys, contains a list of file names. The file names identify the Blackboard Structure Description File (BSDF), and all knowledge source files, both Rule Based Definition Files (RBDF) and Case Description Files (CDF) for a particular application. For knowledge source files, the form of display can also be defined here. If the file name is followed by ",NORMAL", then the knowledge source is allocated a standard size window. If the NORMAL switch is omitted, or if the ICON switch is used, then the knowledge source is only allocated an icon in the upper left corner of the scren. FIG. 27 shows the syntax of the file. Note that all normal UNIX rules for the use of pathnames in file specifications apply. A valid system file must include exactly one BB file first, followed by a minimum of one knowledge source file. All rule based knowledge source file names must precede case based file names.

Blackboard Structure Description File

The Blackboard Structure Description File (BSDF) contains the information necessary to create internal structures used by the blackboard process. The information in the BSDF maps directly into the blackboard structures described herein. A BSDF is identified as filename.bb. The syntax of the BSDF is shown in FIG. 28.

Every object in the blackboard has a separate entry in the BSDF. For every object, all attributes of the object are identified by name. Each object must have a unique name. Attribute names are repeated as necessary. Choices for value types are shown in FIG. 6.

A valid BB file must include a minimum of one object, with a minimum of one attribute.

Rule Base Description File

The Rule Based Definition File (RBDF) contains the information necessary to set up a rule based knowledge source. The data in the RBDF maps directly into the rule base structures described herein. A RBDF is identified as filename.rb. The syntax is shown in FIG. 2.

There are three parts to an RBDF. The EVENTS portion of the RBDF is a list of expressions that are used by the event detector to determine if incoming data constitutes an event relevant to the rule base. The PRECONDITIONS portion of the RBDF is also an expression list, which is used by the activation/agenda manager to further determine if a knowledge source should be activated. For the EVENTS and PRECONDITIONS list of expressions, it is understood that the list is "OR"ed. That is, any of the expressions evaluating to true will indicate to the appropriate process (event detector or activation/agenda manager) that certain conditions have been satisfied. If there are no event expressions, then that knowledge source will execute only if the precondition part includes an every operator. If there are no precondition expressions, then the knowledge source will be activated whenever one of its events is true. The "EXPRESSION:" prefix must be followed by an expression (i.e., it must not be present unless an expression is present.)

The RULE BASE STRUCTURES portion of the RBDF contains the structural information needed by the rule based knowledge source process. The process starter provides the RBDF name to each of these three processes (i.e., event detector, activation/agenda manager and rule based knowledge source); it is their responsibility to extract the necessary information. Each section of the RBDF is separated by a string of '*' characters.

The evaluation expressions used for the EVENTS and PRECONDITIONS, as well as the expressions used in the RULE BASE STRUCTURE part of the RBDF are further discussed herein.

Other comments:
- all references to nodes, contexts and piece-wise linears in rules, meta-rules and evaluators must be defined first in the earlier parts of the RULE BASE STRUCTURE of the file.
- the ***** and ------ lines are required syntax, since they are used by the parsing software as separators between sections of the file.
- a piece-wise linear's XY-LIST must have the X values in ascending order.
- at least one context must have the value of 1 (i.e., when the file is loaded, at least one context must be TRUE; meta-rules can change this during execution.)
- a valid rule base must contain a minimum of one data node, one malfunction node, one rule, and one context.

Case Description File

The Case Description File (CDF) contains the information necessary to set up a case based knowledge source. The data in the CDF maps directly into the case table structure described herein. A CDF is identified as filename.cb. The syntax is shown in FIG. 30.

The division of the CDF into three portions is similar to that for the RBDF. The EVENTS and PRECONDITIONS portions are identical to those for the RBDF. The CASE BASE STRUCTURE portion provides the structures necessary to set up a case table.

The CASE BASE STRUCTURE consists of two parts:

First, functions (equal, greater and less) are defined. Each function is defined in terms of two margins, expressed in percentage points. They work as follows.

equal function (FEQ): if two numbers are within (equal_low_margin)% of each other, then the score is 1.0; if two numbers are more than (equal_high_margin)% different, then the score is 0.0; otherwise, a linear interpolation is performed between the two margins.

greater-than function (FGT): if the current number is greater that the case history value by more than (greater_high margin)%, then the score is 1.0; if the current number is less than the case history value by more than (greater_low_margin)%, then the score is 0.0; otherwise, a linear interpolation is performed betwen the two margins.

less-than function (FLT): if the current number is less that the case history value by more than (less_high margin)%, then the score is 1.0; if the current number is greater than the case history value by more than (less_low margin)%, then the score is 0.0; otherwise, a linear interpolation is performed betwen the two margins.

Second, the cases themselves are defined. Each case must be given a name. Each case in the case table must map into an object attribute in the blackboard. For each case, a set of object attributes is then specified, along with values and weights. The values are given as value, time pairs. Each pair is followed by an optional function name (FEQ, FGT, FLT) and weight. If the latter are omitted, FEQ and W1.0 (weight of 1) are assumed. The match-points-on-curve function, as defined herein is thus invoked by omitting the function names and weights.

A valid case based knowledge source must have a minimum of one case point.

Input Data File

The Input Data File (IDF) contains the sets of data simulating incoming data to the system. The user interface process reads this file and supplies the data to the event detector process. An IDF is identified as filename.dat. The syntax is shown in FIG. 31.

Output Files

Output files are generated by the shell in the course of its operation.

"LOG" Files

LOG files are generated by rule based knowledge sources whose log flag has been turned on. The information in these files provides a relatively detailed trace through the execution of a rule base.

"OUT" Files

Each knowledge source that generates diagnostics writes to an OUT file. Each entry in OUT files generated by a rule based knowledge source represents a diagnostic message, with associated priority and severity measures. Each entry in OUT files generated by a case based knowledge source includes the calculated scores for its cases.

Additional information may be included in these files.

"DIA" File

The Diagnostics File (DIAF) contains the results of a session run. It is a list of the diagnoses and case matches that the shell has made during the just-completed session run. The diagnoses are the ordered combination of the diagnoses made by the individual rule based knowledge sources, followed by the ordered combination of case matches found by the individual case based knowledge sources. Basically, the results existing in the OUT files are merged and sorted by time.

Blackboard Status File

The Blackboard Status File (BSF) is similar to the BSDF in that it contains the structural information necessary to recreate the blackboard. It also contains a snapshot of all of the data values stored in the blackboard. Using the BSF file, the blackboard can be restored on a subsequent session run. Because of its compatibility with the BSDF, it also is identified as filename.BB. The syntax is the same as the BSDF.

USER INTERACTION

All user interaction with the shell occurs through the user interface. The nominal sequence of interaction with the shell is described in herein. Details for the user interface are described elsewhere in this document.

The domain shell program is designed for operation on the Hewlett-Packard 9000, Series 700 family of workstations. The workstation should run the HP-UX operating system, Version 8.05 or higher. The HP-VUE visual user environment should also be present. This environment is layered over a Motif-based X-window system. The domain shell uses xterm windows within this framework.

In order to use the shell, users must create input files to be used by the system. Therefore, it is helpful to be familiar with the shell's overall design concept as well as the individual input files' syntax and structure. Other sections herein contain the overall system design description and describe the operation of the components of the domain shell.

The creation of input files must be done prior to the operation of the shell. In order to use the shell, the following files must be created: system file, blackboard structure description file, one rule base description file for each rule base, one case description file for each case base, and at least one input data file. The uses of these files are described herein. The location of these files is not restricted; however, if they are not located in the same directory as the shell executable files then the full pathname of the file must be given in the system file. The application develoment environment in the Version 1 software manages the naming and placement of files automatically. The developer only needs to name the application and the knowledge sources.

System File

The system file contains a list of filenames identifying the blackboard structure description file, and all rule base and case description files for the system. The system file is identified as such by the suffix .sys. The file format is shown in FIG. 27.

Note that the order of files named in the system file is important. The name of the blackboard structure description file should be specified first, then all rule base description files, and finally all case description files. This is the order that is shown in FIG. 27. Only one file should be specified per line. All of the files specified in the system file should exist or initialization errors will occur.

The shell assumes that the files specified in the system file reside in the same directory as the shell executable files unless full pathnames are used in the system file.

There is an option available to determine whether to fully open a knowledge source window or iconify it. The default system operation is to iconify all knowledge source windows. However, if a ,NORMAL is placed at the end of a knowledge source file specification line, then the window associated with that knowledge source's process will be fully opened. This feature is useful for making detailed observations of the operation of a particular knowledge source. If desired, all knowledge source windows can be fully opened by using the same ,NORMAL suffix on all knowledge source file specification lines. The default behavior (iconified knowledge sources) can be explicitly specified by using ,ICON at the end of a knowledge source specification line.

Blackboard Structure Description File

The blackboard structure description file (BSDF) contains the definition of all objects, and all attributes for each object. Objects and attributes are identified by names given by the user. The blackboard file is identified as such by the suffix .bb. The file format is shown in FIG. 28.

The names of the objects and associated attributes are used in the knowledge source description files, and in the input data files. Names must match exactly in spelling and case in order for the shell to operate properly.

Only blackboard data values of type double are allowed. There is no specific maximum history length. Since the blackboard will maintain data points it receives within this history length, excess memory will be used and the system will be slowed needlessly if the history length is longer than what is required by the knowledge sources. A good check on this is to review the history lengths required by knowledge sources and adjust the blackboard history lengths appropriately.

Significant data received by the blackboard can be forwarded to the user interface windows Under the object's attribute, include the line, DEMON: MMI__ WRITE. When the blackboard receives a new value of this object attribute, the object and attribute names and the value will be forwarded to the man machine interface. The value will be shown in the man machine window. This is a powerful tool for working with the shell, since it allows any object attribute to be tracked as the system is running. However, if too many object attributes have the DEMON turned on, the system will be slowed, and the number of values printed in the man machine window will be large. Once an application is tested, the use of the DEMON should be reserved for significant object?attributes, such as those representing malfunctions. This is a feature of only the prototype. The user interface is the proper destination for blackboard data.

Rule Base Description Files

Each rule base is defined by a description file that is comprised of three sections. The first section is a list of event expressions, called EVENTS. These expressions are used by the event detector to determine if a knowledge source should be placed on a list of knowledge sources to be fired which will be sent to the agenda manager. The second section is a list of event expressions, called PRECONDITIONS. These expressions are used by the agenda manager to check if a knowledge source should be fired at a given time.

For the EVENTS section, care should be exercised in writing event expressions that depend on the arrival of new data. Each event expression should refer to new data arriving from one source only (either the user interface or one of the other knowledge sources). All data is sent through the event detector, but each source of data (a knowledge source or the user interface) sends it in separate batches. Therefore, the event detector can only recognize data in a particular batch as new, even if data arriving from another source has the same time stamp. In general, caution should be exercised in writing event expressions with more that one "new" data point in the expression.

The PRECONDITIONS section contains expressions that are similar to those in the EVENTS section. Also, a periodic precondition can be set to cause a knowledge source to fire at regular intervals. This is done by placing a statement "every n" as a precondition, where n is the interval duration in seconds.

The third section defines the rule base structure, including all components of rule base such as hypotheses, malfunctions, rules, etc. A rule base description file is identified as such by the suffix .rb. Details of the file format are shown in FIG. 29.

The blackboard structure description file should be referenced and edited as necessary so that all object attributes named in the rule base as blackboard elements exactly match the names in the blackboard; mismatches will cause the rule base to fail to properly initialize.

There are many operators available in constructing a rule based description file.

Case Description Files

Each case base is defined by a description file that also contains three sections. The first two sections are EVENTS and PRECONDITIONS sections as described above. The third section contains the case base itself, consisting of a set of cases with values. A case description file is identified as such by the suffix .cb. Details of the file format are shown in FIG. 30.

As for the rule based description files, the object attributes in the case based files must exactly match blackboard object attributes, or a loading error will occur.

Each case should be comprised of a set of object?attributes with associated case values. The time stamps used for the case values should reflect the required time intervals necessary for comparison; the absolute time is not important. For example, if in a particular case, an object attribute has a characteristic set of values over a 10 second period, the difference in the time stamps between the most recent and oldest values should be 10 seconds.

Input Data File

This file consists of the data that is to be used by the shell to simulate the arrival of actual data. The input data file is identified as such by the suffix .dat. The file format is shown in FIG. 31.

Input data is expected to be structured so that all data with a particular time stamp is grouped together in the same data set.

Object attribute names should exactly match the blackboard names. An error will be reported when the input data file is scanned if name mismatches occur.

The data in the input data file should appear in chronological order, from earliest data to latest data.

The input data file is intended only for testing purposes, to verify proper application operation.

Log Files

Each knowledge source that generates diagnostics writes to a Log File (RLOGF or CLOGF), with entries representing a diagnostic message with associated priority and severity measures. The syntax is shown in FIG. 32.

Diagnostic File

The Diagnostic File (DIAF) contains the results of a session run. It is a list of diagnoses with associated confidence factors. The syntax is shown in FIG. 33.

Blackboard Status File

The Blackboard Status File (BSF) is similar to the BSDF in that it contains information necessary to recreate the blackboard. Using the BSF file, the blackboard can be restored on a subsequent session run. The syntax is shown in FIG. 34.

USE OF THE PROGRAM

The user must be in the directory where the domain shell executable files reside. All input files should also be in this directory, unless full pathnames are used for files located elsewhere. Also, output files are written in this directory. The program opens at least five windows during execution so it is advisable to have a display with only one window currently open. This window can reside anywhere on the display, but it is recommended that it be placed in the lower left corner.

The program is invoked by typing the program's name followed by the system file name. As currently installed, the program's name is user_int. This can be changed by the user if desired. However, the names of the other executable files should not be changed.

Windows will be opened for each of the domain shell processes: blackboard, event detector, agenda manager, man machine interface, and each knowledge source. All windows are xterm windows, and can be resized, moved, or iconified. Each window is appropriately titled in the title bar—knowledge source windows are identified by their respective description file names. All knowledge source files are initially iconified (unless the NORMAL window option was specified in the system file), but can be opened as desired by the user. Within a window, the user can select a variety of viewing and tracing options by placing the pointer within the window, hitting the left or the center mouse button while holding the Ctrl key down, and choosing the desired option. A scrollbar for the window can be enabled by hitting Ctrl-Center_Mouse_Button and choosing the option "Enable Scrollbar".

A window's title bar identifies the process running within it (with the exception of the user interface window, which is a standard terminal window that the user has previously opened). The knowledge sources are identified by the name of the knowledge source description file associated with it. When the windows are iconified, the knowledge source windows are still identified by the description file's name; the other processes are identified by two letter abbreviations—bb for blackboard, ed for event detector, am for agenda manager, and mm for man machine interface.

Most interaction with the user occurs in the first window, where the program was started. This window will present the user with a menu of top level options after the system is set up. There are four choices: Start Data, Continue Data, Set Operating Parameters, and End the Session.

Start Data—Option 1

This option, when chosen by the user, prompts him for the name of an input data file. It then notifies all knowledge sources to reset and prepare for a session run. After scanning the input data file, the program prints the length of time needed to run the data in seconds. The user is given the option of compressing the time scale in order to complete a data set run in a shorter or longer period of time. The compression factor is divided into time intervals extracted from the data file to determine the compressed interval. After the compression factor is set, data is read from the input data file and sent at the appropriate time to the event detector, which forwards it to the blackboard. The system will operate, firing knowledge sources as appropriate, until the input data is exhausted. Informational messages will appear in the shell windows as the data set run proceeds. When the run is over, the user is presented with the top level menu in the user interface window.

Evidence of the operation of the blackboard is shown by the use of the characters '>' and '<' in the blackboard window. When data is placed in the blackboard, the '>' character is printed; when data is retrieved from the blackboard, the '<' character is printed.

The event detector will print out a set of three '.' characters as it proceeds with the evaluation of event expressions. The agenda manager will also show a set of three '.' characters indicating the completion of an activity. The man machine interface will print received data in its window as the blackboard sends it. Each data point sent will be displayed along with the object and attribute names. Only those object?attributes with DEMON: MMI_WRITE will be displayed, and only when a new value is received by the blackboard.

If Start Data is chosen again after a data set has been run, then all data in the blackboard is discarded and all knowledge sources are reset. This, in effect, starts the session over. For continuing a run with further data, use Option 2, Continue Data.

Continue Data—Option 2

This option causes the system to run a data set in a manner identical to that for Option 1—Start Data. However, for the Continue Data option no messages are sent to knowledge sources to reset, and the blackboard data is retained from the previous run. This allows the rule bases to continue operation with current values that were set as a result of operations during a previous data set run. As for Option 1, the user is prompted for the name of an input data file. Data in this file should be begin with a time stamp that is chronologically later than the last data in the previous data set in order for this option to operate correctly. If further data is sent to the blackboard with time stamps earlier than data from a previous run, the blackboard will place the data in the blackboard as a current value for an attribute with no history. However, for attributes with non-zero history length, the blackboard will insert the value at someplace in the history other than as the latest value. This will cause indeterminate behavior as the event detector may fire a knowledge source based on the arrival of "new" data; when the knowledge source retrieves the data from the blackboard, the data is hidden and the knowledge source fires using possibly incorrect data points.

When the data set is running, the appearance of the shell processes is identical to that for Option 1—Start Data.

Set Operating Parameters—Option 3

This option allows the user to set parameters for rule bases. If this option is chosen, the user is prompted for the name of a rule base. Only rule bases have the option of setting operational parameters. The case based knowledge sources have no Set Parameter options. There are six choices for setting parameters: Trace, Log, Step, Breakpoint, Alpha/Beta, and SF/NF.

If Option 3 is selected by the user, he is then prompted to enter the name of a knowledge source file. This specifies the knowledge source file for which the parameter is to be set. Currently, only rule bases have parameters that can be set. After the knowledge source file is specified, the user is then prompted to enter the code corresponding to the parameter to be set.

Trace—Parameter Option 0: If this option is chosen, the user is asked whether to disable or set a tracing capability. When set, this causes detailed descriptions to be displayed in the rule base window when each rule in the rule base is fired.

Log—Parameter Option 1: If this option is chosen, the user is asked whether to disable or set a logging capability. When set, this causes descriptions identical to those generated for the Trace option to be sent to a file. The file is named with a root name the same as the rule base description file that created it, with the .log extension.

Step—Parameter Option 2: If this option is chosen, the user is asked whether to disable or set the step functionality. When set, the Step option causes the rule base to stop after each rule is fired; the rule base will continue only when the user acknowledges the rule firing by responding in the rule base window. Therefore it is necessary for the user to change his focus of attention to the rule base window when this option is set. When the rule base fires, the processing will stop and the user will have options within the rule base. Data will continue to be sent to the blackboard, and all other shell processes will proceed. However, further knowledge source firings will be delayed until the user has completed stepping through the rules in the rule base. Execution of the rest of the shell will therefore be disabled. The purpose of the Step option is to allow the user to follow in detail the sequence of rule firings in a rule base. Since its use generaly ruins the timing of process execution, it should only be used in configurations with only one knowledge source, for debugging purposes.

Breakpoint—Parameter Option 3: If this option is chosen, the user can set or remove breakpoints at rules in a rule base window. In order to use this option, the user must move to the appropriate rule base window in order to set the breakpoints. In the rule base window, the user can set and remove breakpoints for any rule in the rule base. Upon completion, the user must return to the first window to choose a top level option.

As with the Step option, rule base operation is suspended during firing if breakpoints are set. The use of breakpoints is for observation of rule base operation, rather than shell performance as a whole. In other words, it should only be used in configurations with only one knowledge source, for debugging purposes.

Alpha/Beta—Parameter Option 4: If this option is chosen, global values for alpha and beta cutoffs can be set for a particular rule base. The user is prompted to enter values for alpha and beta (from $-1.0$ to $+1.0$). These values are then passed to the rule base specified.

SF/NF—Parameter Option 5: If this option is chosen, global values for the sufficiency and necessity factors (SF and NF) for rules can be set for a particular rule base. The user is prompted to enter values for SF and NF (from $-1.0$ to $+1.0$). These values are then passed to the rule base specified.

End the Session—Option 4: If this option is chosen, the session is ended and the program exits. Output files are written as described elsewhere. Each knowledge source generated a log file that contains a list of diagnoses. The blackboard writes an output file that contains the structural information from the blackboard input file, and a snapshot of all data values currently stored in the blackboard.

OUTPUT FILES

When the session is ended, each of the knowledge sources prints out at least one output file that contains the results of operation. A rule base may print out a log file if that parameter has been set through the set parameter option.

Each time a session has ended after a set of data has been run, every rule base for the system will create an output file with the results of diagnosis. This file has the same root filename as the rule base description file, but with the suffix .out. The results of diagnostics generated each time the rule base was fired are written into this file. The data written includes the diagnoses that are reached, the number of rules that were fired, and the number of rules fired per second.

If the LOG option has been selected for the rule base, then an output log file is created. This file has the same root filename as the rule base description file, but with the suffix .log. This contains detailed messages that indicate the sequence of operation of the rule base.

The case based processes will write out the results of scoring cases into a file with the same root name as the case description filename's root, and with the suffix .out. The file will contain a record of the results of scoring over a complete data set run.

The blackboard produces an output file that contains all of the object and attribute information from the input file plus all of the data currently stored in the blackboard. This file can be used as an input file for subsequent session runs. In this case, input data sets should contain time stamps chronologically later than the latest data in the blackboard, or indeterminate behavior will result.

ERRORS

Errors encountered in using the shell can generally be divided into two categories: syntax/loading errors and logical errors. If a particular knowledge source encounters an error, it will print an error message identifying the line number in the file where the error is located. An error message is sent to the user interface. This causes the user interface to try to kill the shell processes and exit.

Logical errors are causes when the information contained in the knowledge source files does not correspond to the desired performance due to incorrect rules, etc. These errors may be difficult to locate. The shell provides several tools to assist in following the operation of the individual shell processes. These include the Set Parameter Options for the rule bases. Also, the values of object attributes posted on the blackboard can be printed in the man machine window using the DEMON feature. All of the output files can be used to assist in discovering the error.

CONTROL MODULE

The control module is responsible for coordinating the activities of various parts of the shell. Its design is intended to allow the application developer to specify control actions that may lead to applications that exhibit the following characteristics:

speed: the ability to execute a task in a short period of time, and with minimum control overhead
 responsiveness: the ability to react to changed conditions when the reaction is required
 timeliness: the ability to reach conclusions (diagnoses, or partial diagnoses) by the time they are needed
 adaptability: the ability to change strategy as conditions change.

Note that these characteristics are not inherently built into the control module software; rather it is the application developer's responsibility to make judicious use of the features of the control module and thereby accomplish the desired results.

Speed depends strongly on the individual performance characteristic of each knowledge source. The control module contributes overhead. It is obviously desirable to maintain a small control overhead time to knowledge source execution time ratio. One way to do this is to minimize overhead, but this is only possible up to a point. Increasing the grain size of the knowledge sources is another way. Unfortunately, large grained knowledge sources tend to be unresponsive. Thus knowledge sources are interruptible.

Interruptibility is also useful for adaptability. Since this blackboard architecture is essentially event driven, it is possible that asynchronous events can change the execution environment (context) to an extent that the currently executing knowledge source is irrelevant or even inappropriate. The control module can then abnormally stop the current knowledge source and start executing other knowledge sources.

An aspect of interruptibility appears when asynchronous events change the context such that the currently executing knowledge source is superseded in importance by other knowledge sources. This situation is resolved by the use of priority levels associated with each knowledge source. A knowledge source which was interrupted because of higher priority tasks can be defined to be resumable.

The fundamental aspect of the control mechanism of the shell is that it is strictly condition driven.

It has two modes of operation:
1. Data driven: the conditions that trigger the execution of the knowledge sources are the asynchronous receiving of data. This data can be from outside the system (usually from on-line sensors), or it can be the results of executing another knowledge source. Usually, it is not just the receiving of data that defines a triggering condition, but rather that the received data satisfy more specific conditions, such as leaving a pre-defined normal range.
2. End-user requested: the condition that leads to the execution of a specific knowledge source is caused by an end-user request. This would usually happen if high quality triggering conditions are not known, and thus a knowledge source should execute strictly under end-user control, or if the condition definitions are incomplete, and the end-user suspects that a specific knowledge source can contribute to the on-going diagnostic process.

The control mechanism needs the following information in order to operate:
1. A set of conditions that cause a process (knowledge source, or external) to execute. For performance reasons, the triggering conditions are divided in two groups: events and preconditions. The difference between them is artificial, and it is the application developer's responsibility to divide the conditions among the two groups in such a way that the performance is optimal.
2. Each process (knowledge source, or external) must be charcterized as interruptible or not. Each interrubtible process must have a priority level.
3. Each interruptable process (knowledge source, or external) may have a set of refire conditions defined, which will allow the control mechanism to determine if an interrupted knowledge source should be reactivated or terminated upon completion of the interrupting action.
4. Each process can time-out or not. For those processes that can time-out, a running time must be specified, at the expiration of which, the process is suspended, terminated, or continued.

The checking of conditions can be thought of in terms of a rule base paradigm:

IF condition-is-true THEN perform-action

The conditions on the left hand side of control rules are represented in terms of expressions, consisting of operands, which are data points (expressed as blackboard object/attributes) and operators, described in Appendix A.

The only right hand side action is to activate a process, which can be a knowledge source, or an external process.

The control mechanism consists of the continuous repetition several steps:
1. Event detection: all data going to the blackboard passes through the event detector module. Every time a data packet is received by the event detector, it evaluates the truth of the event preconditions that involve information in the packet. For each true condition, the corresponding process activation request is passed on to the next step.
2. Activation: the requests received from step 1 are processed by the activation manager module. For each knowledge source or external process activation request, its preconditions are evaluated. Those found to be true are also passed on to the next step.
3. Scheduling: the requests from step 2 are received by the agenda manager. This module keeps track of the currently executing module, and it schedules the new requests according to priority levels. This may require the suspension of the current activity. This module also determines if a suspended task should be resumed (refired) or not, and if a running task should be timed-out or not.

As stated earlier, the control mechanism is largely application specific. While the architecture described above is quite general in nature, the tasks carried out by the various modules may contain numerous elements that are application specific. As always in this type of situation, an approach that uses a mix of procedural (control actions) and declarative (control rules) methods should be implemented in the future.

The control module is responsible for coordinating the activities of the shell for the purpose of diagnosing occurring or impending malfunctions. It is the repository of the problem solving strategy needed to accomplish an application's goals. Since different problems require different strategies, the control module will be largely application specific. Nevertheless, given common characteristics of the real-time plant diagnostic domain, several functional requirements can be described and implemented.

GENERAL REQUIREMENTS

The real-time nature of the shell is reflected in the following control module requirements:
  speed is the ability to execute a task in a short period of time, and with minimum control overhead
  responsiveness is the ability to react to changed conditions when the reaction is required
  timeliness is the ability to reach conclusions (diagnoses, or partial diagnoses) by the time they are needed
  adaptability is the ability to change strategy as conditions change.

GENERAL CHARACTERISTICS

Speed depends strongly on the individual performance characteristic of each knowledge source. The control module contributes overhead. It is obviously desirable to maintain a small control overhead time to knowledge source execution time ratio. One way to do this is to minimize overhead, but this is only possible up to a point. Increasing the grain size of the knowledge sources is another way. Unfortunately, large grained knowledge sources tend to be unresponsive. This leads to one of the fundamental required characteristics for this system: large knowledge sources should be interruptible.

Interruptibility is also necessary for the adaptability requirement. Since blackboard architectures use essentially event driven mechanisms, it is possible that asynchronous events can change the execution environment (context) to an extent that the currently executing knowledge source is irrelevant or even inappropriate. The control module should be able to abnormally stop the current knowledge source and give control to other knowledge sources.

An aspect of interruptibility appears when asynchronous events change the context such that the currently executing knowledge source is superseded in importance by other knowledge sources. This situation introduces another fundamental required characteristic of this system: knowledge sources should be prioritized. Finally, a knowledge source which was interrupted because of higher priority tasks, may or may not be resumable.

These characteristics can be summed up in one expression: dynamic focus of attention.

EVENTS

The fundamental aspect of the control mechanism is that it is strictly event driven. It has two modes of operation:
  1. Under normal conditions, it is purely on-line, sensor data driven. The events that trigger the execution of the knowledge sources are simply the receiving of sensor data. The main characteristic of this mode is that no malfunctions are detected, i.e., everything is "normal", and no interaction is required with the end user. The control module basically allows the knowledge sources to execute in sequential fashion, without interruption, until . . .
  2. . . . asynchronous events take place which require immediate attention. Such events can be on-line generated, by sensor values leaving pre-defined normal ranges, or they can be the result of executing a knowledge source, or they can be end user generated, by specific requests for focus of attention. There may be yet other ways to generate events.

A special type of event is expiration of time. The system clock tick is a periodic data point.

CONTROL ARCHITECTURE

Figure 35:
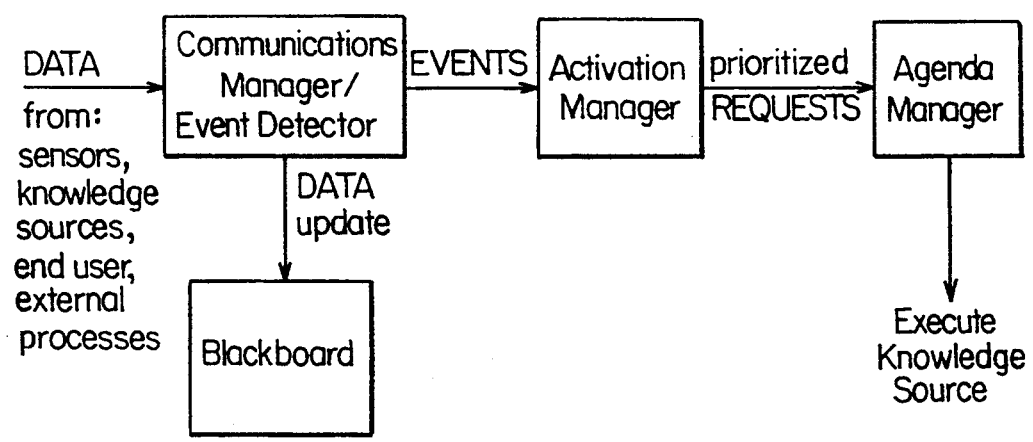
FIG. 35 is a block diagram of a blackboard control module.

Blackboard control mechanisms generally consist of the continuous repetition of a four step cycle:
  trigger
  precondition check
  schedule, and
  execute The block diagram in FIG. 35 shows an approach that closely matches these steps, while also showing some differences. Each module is described next.

The communications manager/event detector is similar, but not identical to the trigger mechanism found in common blackboard control. It performs the dual role of carrying out communications with sources of data, and determining if the incoming data forms an event. Data may originate external to the system, in which case the communications manager receives it from the I/O interfaces (discussed in the Interface Requirements section), or from local sources (knowledge sources, the user interface, or the system clock). In any case, once the data is received, it is written on the blackboard, if appropriate, and tested for event generation. The results of this last step are passed on to the next module.

The activation manager plays the role of the precondition check. In many applications of blackboard architectures this is a rather time consuming task, generating high overhead. A simple approach is used in accordance with the present invention and is necessary for improved system performance. A two-step method of the present invention includes: first use look-up tables to find the knowledge source(s) affected by the incoming event, and extract (from the table) its self-selecting precondition; second execute the precondition. If true, determine the task's priority and place the KSAR (Knowledge Source Activation Request/Record) onto the next module's agenda.

The agenda manager is the basic scheduler, but it does more than just schedule the next knowledge source to execute: it also determines if the currently executing knowledge source should be interrupted (if it is interruptible), determines if it is resumable, in which case it is only suspended (and rescheduled for continuation), etc. Note that this module is not a full-blown agenda-based multi-tasking controller, but rather it only implements the specific required characteristics for this domain shell, as discussed here.

IMPLEMENTATION

As stated earlier, the control mechanism is largely application specific. While the architecture described above is quite general in nature, the tasks carried out by the various modules may contain numerous elements that are application specific. As always in this type of situations, an approach that uses a mix of procedural and declarative methods is most appropriate.

In particular, the event detector is highly specific to each application. A declarative syntax (rules) could be used to allow the application developer to tailor this module to each application. Typical examples of declarative descriptions are "whenever" and "every <time interval>" rules. On the other hand, a procedural component will inevitably be needed and has to be taken into account. The other two modules, the activation and the agenda managers, are purely procedural, since the approach described in the previous section is believed to apply across all applications in the domain considered here.

Another implementation aspect is related to the partitioning of the modules shown in FIG. 35 into executable processes. Since incoming data arrives asynchronously, the communications manager/event detector module must form a process by itself. The other two modules could form one process, activated by the detection of an event. The execution of a knowledge source obviously forms a separate process.

The event detector module of the control module includes data structures which receive all data inputted to the blackboard from various sources. The data structures are arranged to analyze the data and determine whether any knowledge source execution preconditions are met. In other words, the data structures look at the data and determine which if any knowledge sources operate on that data. An algorithm implemented by the data structures maps data as it is received such that only the knowledge source which acts on the specific data received is subsequently checked to see if it is available for execution. The activation/agenda module does this checking in accordance with the predetermined knowledge source priority scheme. Therefore, significant time is saved in that only knowledge sources which operate on the specific data received are checked by the control module for execution availability. Thus, in a system having a plurality of knowledge sources acting on different data points, significant time is saved with the algorithm of the present invention. Having now described a limited number of embodiments of the invention, it should now be apparent to those skilled in the art that numerous other embodiments and modifications thereof are contemplated as falling within the scope of the present invention as defined by the appended claims.

What is claimed is:

1. An artificial intelligence software shell for plant operation simulation comprising:
   a blackboard module including a database having objects representing plant elements and concepts;
   at least one knowledge source module including an artificial intelligence operation scheme, in communication with the blackboard module, operating on specific predefined blackboard objects;
   an input data module, in communication with the blackboard module and the at least one knowledge source module, enabling data to be inputted to the shell;
   a control module, in communication with the input data module and the at least one knowledge source module, receiving all input data and controlling operation of the at least one knowledge source;
   the control module including an event detector module, in communication with the input data module, receiving all input data and determining when the at least one knowledge source module should execute;
   the event detector module including:
      a hash table having entries for each input data source;
      a data point structure including entries for objects and corresponding attributes and values, the entries of the hash table pointing to entries in the data point structure;
      an indirect expression list pointed to by the data point structure;
      an expression list, pointed to by the indirect expression list including entries for knowledge source previous and updated values; and
      a message evaluator, receiving messages related to input data, checking the messages for syntax errors and implementing a hash table algorithm if no syntax error is found.

2. A software shell as claimed in claim 1 wherein the control module further includes:
   an activation/agenda manager module, in communication with the at least one knowledge source module and the event detector module, executing the at least one knowledge scarce module in accordance with a predetermined knowledge source priority scheme.

3. A software shell as claimed in claim 2 wherein the at least one knowledge source module includes:
   a rule-based knowledge source module having a forward-chaining belief propagation scheme including rules in if-then-else form with associated levels of belief; and
   a case-based knowledge source module having a data comparison scheme including predefined patterns and conditions, whereupon execution of the case-based knowledge source, the conditions are inferred to be true if a certain level of closeness is found between received data and the patterns.

4. A software shell as claimed in claim 3 wherein each of said modules includes a software process.

5. A software shell as claimed in claim 3 wherein the blackboard module database includes a hierarchy of objects having vertical hierarchical connections and horizontal links.

6. A software shell as claimed in claim 5 wherein each blackboard object has attributes and each attribute has at least one value, the database including a hash table and plurality of pointers for linking the objects and corresponding attributes and values.

7. A software shell as claimed in claim 6 wherein the activation/agenda manager module further includes:
   a priority based algorithm for determining activation of event driven knowledge sources;
   a time-based queue for periodic knowledge sources; and
   a knowledge source/precondition expression structure for checking knowledge source execution preconditions.

8. A software shell as claimed in claim 7 wherein the activation/agenda manager module further includes:
   an array having objects and corresponding attributes and values; and
   an expression list including each knowledge source pointed to by the array.

9. A software shell as claimed in claim 5 wherein the vertical hierarchical connections include IS-A and PART-OF hierarchical connections.

10. A software shell as claimed in claim 2 wherein the at least one knowledge source includes a plurality of knowledge sources with varying degrees of priority.

11. A software shell as claimed in claim 2 wherein the activation/agenda manager module includes a mechanism for interrupting execution of a knowledge source and executing a higher priority knowledge source in accordance with the knowledge source priority scheme.

12. A software shell as claimed in claim 11 wherein the activation/agenda manager module includes a mechanism for determining whether an interrupted knowledge source should be rescheduled for execution.

13. A software shell as claimed in claim 2 wherein the event detector module includes a data structure implementing an algorithm such that when data is received, only a knowledge source which operates on the received data is checked for execution availability.

14. A software shell as claimed in claim 1 wherein the at least one knowledge source module includes:
a rule-based knowledge source module having a forward-chaining belief propagation scheme including rules in if-then-else form with associated levels of belief; and
a case-based knowledge source module having a data comparison scheme including predefined patterns and conditions, whereupon execution of the case-based knowledge source, the conditions are inferred to be true if a certain level of closeness is found between received data and the patterns.

15. A software shell as claimed in claim 14 further including:
a blackboard structure description file including object names and attribute/value pairs for each object;
a rule-based description file including rules forming the rule-based knowledge source and a description of execution preconditions for the rule-based knowledge source; and
a case-based description file including cases forming the case-based knowledge source and a description of execution preconditions for the case-based knowledge source;
wherein the blackboard structure description file, rule-based description file, case-based description file, and input data file are user created.

16. A software shell as claimed in claim 15 further including:
a diagnostics file, created by the shell for each input data file cycle completed, including diagnoses made by the rule-based knowledge source and case matches found by the case-based knowledge source; and
a blackboard status file, created by the shell, including blackboard information as modified by any knowledge sources after completion of each input data file cycle.

17. A software shell as claimed in claim 1 wherein the blackboard module database includes a hierarchy of objects having vertical hierarchical connections and horizontal links.

18. A software shell as claimed in claim 17 wherein each blackboard object has attributes and each attribute has at least one value, the database including a hash table and plurality of pointers for linking the objects and corresponding attributes and values.

19. A software shell as claimed in claim 17 wherein the vertical hierarchical connections include IS-A and PART-OF hierarchical connections.

20. An artificial intelligence software shell for plant operation simulation comprising:
means for storing objects representing plant elements and concepts;
at least one knowledge source module including and artificial intelligence operation scheme, in communication with the means for storing, operating on specific predefined objects;
means, in communication the means for storing and the at least one knowledge source module, for enabling data to be inputted to the shell;
means, in communication the means for enabling and the at least one knowledge source module, for receiving all input data and controlling operation of the at least one knowledge source module; and
means, in communication with the means for enabling, for determining when the at least one knowledge source module should execute;
the means for determining including:
a hash table having entries for each input data source;
a data point structure including entries for objects and corresponding attributes and values, the entries of the hash table pointing to entries in the data point structure;
an indirect expression list pointed to by the data point structure;
an expression list, pointed to by the indirect expression list including entries for knowledge source previous and updated values; and
a message evaluator, receiving messages related to input data, checking the messages for syntax errors and implementing a hash table algorithm if no syntax error is found.

21. A software shell as claimed in claim 20 wherein the means for receiving and controlling further include:
means, in communication with the at least one knowledge source module and the means for determining, for executing the at least one knowledge source module in accordance with a predetermined knowledge source priority scheme.

22. A software shell as claimed in claim 21 wherein the at least one knowledge source module includes:
a rule-based knowledge source module having a forward-chaining belief propagation scheme including rules in if-then-else form with associated levels of belief; and
a case-based knowledge source module having a data comparison scheme including predefined patterns and conditions, whereupon execution of the case-based knowledge source, the conditions are inferred to be true if a certain level of closeness is found between received data and the patterns.

23. A software shell as claimed in claim 22 wherein the means for storing includes a database having a hierarchy of objects having vertical hierarchical connections and horizontal links.

24. A software shell as claimed in claim 23 wherein each object has attributes and each attribute has at least one value, the database including a hash table and a plurality of pointers for linking the objects and corresponding attributes and values.

25. A software shell as claimed in claim 24 wherein the means for executing includes means for interrupting execution of a lower priority knowledge source and executing a higher priority knowledge source in accordance with the knowledge source priority scheme.

26. A software shell as claimed in claim 25 wherein the means for determining includes means for receiving input data, determining when knowledge source execution preconditions are met, and checking only a knowledge source whose execution preconditions are met for execution availability.

27. A software shell as claimed in claim 26 further including:
- a blackboard structure description file including object names and attribute/value pairs for each object;
- a rule-based description file including rules forming the rule-based knowledge source and a description of execution preconditions for the rule-based knowledge source; and
- a case-based description file including cases forming the case-based knowledge source and a description of execution preconditions for the case-based knowledge source;
- wherein the blackboard structure description file, rule-based description file, case-based description file, and input data file are user created.

28. A software shell as claimed in claim 27 further including:
- a diagnostics file, created by the shell for each input data file cycle completed, including diagnoses made by the rule-based knowledge source and case matches found by the case-based knowledge source; and
- a blackboard status file, created by the shell, including blackboard information as modified by any knowledge sources after completion of each input data file cycle.

29. A software shell as claimed in claim 28 further including stream sockets for intercommunication, the sockets communicating messages in the form of a request-response pair.

30. A method of simulating plant operation with an artificial intelligence software shell comprising the steps of:
- storing, in a database, objects representing plant elements and concepts;
- reading input data from an input data source;
- determining, from the input data read, when artificial intelligence knowledge sources should execute in accordance with a predetermined knowledge source priority scheme; and
- executing knowledge sources, in accordance with the determination, on specific predefined objects;
- wherein the step of determining includes the steps of receiving messages relating to input data, checking the messages for syntax errors and implementing a hash table algorithm if no syntax error is found.

31. A method as claimed in claim 30 wherein the step of executing knowledge sources includes the step of updating object values.

32. A method as claimed in claim 31 wherein the step of executing knowledge sources includes the steps of:
- executing rule-based knowledge sources having a forward-chaining belief propagation scheme including rules in if-then-else form with associated levels of belief;
- and executing case-based knowledge sources having a data comparison scheme including predefined patterns and conditions.

33. A method as claimed in claim 32 wherein the step of executing case-based knowledge sources includes the step of inferring to be true the conditions if a certain level of closeness is found between received data and the patterns.

34. A method as claimed in claim 33 wherein the step of storing includes the step of storing objects, attributes and values, each object having an attribute and each attribute having at least one value.

35. A method as claimed in claim 34 wherein the step of executing knowledge sources includes the step of interrupting execution of a lower priority knowledge source and executing a higher priority knowledge source in accordance with the knowledge source priority scheme.

36. A method as claimed in claim 35 wherein the step of executing knowledge sources further includes the step of, after the step of interrupting, determining whether an interrupted knowledge source should be rescheduled for execution.

37. A method as claimed in claim 36 wherein the step of executing knowledge sources further includes the step of, after determining whether an interrupted knowledge source should be rescheduled for execution, rescheduling that knowledge source in accordance with the determination.

38. A method as claimed in claim 37 wherein the step of determining includes the steps of determining when knowledge source execution preconditions are met and checking only a knowledge source whose execution preconditiions are met for execution availability.

39. A method as claimed in claim 31 wherein the step of determining includes the steps of determining when knowledge source execution preconditions are met and checking only a knowledge source whose execution preconditions are met for execution availability.

40. A method as claimed in claim 39 further including the steps of:
- generating a blackboard structure description file including object names and attribute/value pairs for each object;
- generating a rule-based description file including rules forming the rule-based knowledge source and execution preconditions; and
- generating a case-based description file including cases and a description of execution preconditions.

41. A method as claimed in claim 40 further including the steps of:
- generating a diagnostics file including diagnoses made by the rule-based knowledge sources and case matches found by the case-based knowledge sources; and
- generating a blackboard status file including blackboard information as modified by any knowledge sources during execution.

42. A method as claimed in claim 31 further including the steps of communicating messages through communication links between modules in the form of request-response pairs.

43. A control module for an artificial intelligence software shell for plant operation simulation, the shell including a blackboard module database having objects representing plant elements and concepts, and at least one knowledge source module including an artificial intelligence operation scheme for execution on the blackboard objects, the control module comprising:

an event detector module, in communication with the blackboard module, receiving all input data and determining when the at least one knowledge source module should execute; and an activation/agenda manager module, in communication with the at least one knowledge source module and the event detector module, executing the at least one knowledge source module in accordance with a predetermined knowledge source priority scheme;

the event detector module including:
- a hash table having entries for each input data source;
- a data point structure including entries for objects and corresponding attributes and values, the entries of the has table pointing to entries in the data point structure;
- an indirect expression list pointed to by the data point structure;
- an expression list, pointed to by the indirect expression list including entries for knowledge source previous and updated values; and
- a message evaluator, receiving messages related to input data, checking the messages for syntax errors and implementing a hash table algorithm if no syntax error is found.

44. An artificial intelligence software shell for plant operation simulation comprising:
- a blackboard module including a database having objects representing plant elements and concepts;
- at least one knowledge source module including an artificial intelligence operation scheme, in communication with the blackboard module, operating on specific predefined blackboard objects;
- an input data module, in communication with the blackboard module and the at least one knowledge source module, enabling data to be inputted to the shell; and
- a control module, in communication with the input data module and the at least one knowledge source module, receiving all input data and controlling operation of the at least one knowledge source;
- wherein the control module includes an event detector module, in communication with the input data module, receiving all input data and determining when the at least one knowledge source module should execute; and
- the event detector module further including a message evaluator, receiving messages related to input data, checking the messages for syntax errors and implementing a hash table algorithm if no syntax error is found.

45. A control module for an artificial intelligence software shell for plant operation simulation, the shell including a blackboard module database having objects representing plant elements and concepts, and at least one knowledge source module including an artificial intelligence operation scheme for execution on the blackboard objects, the control module comprising:
- an event detector module, in communication with the blackboard module, receiving all input data and determining when the at least one knowledge source module should execute; and
- an activation/agenda manager module, in communication with the at least one knowledge source module and the event detector module, executing the at least one knowledge source module in accordance with a predetermined knowledge source priority scheme; and
- the event detector module including a message evaluator, receiving messages related to input data, checking the messages for syntax errors and implementing a hash table algorithm if no syntax error is found.

46. A control module for an artificial intelligence software shell for plant operation simulation, the shell including a blackboard module database having objects representing plant elements and concepts, and at least one knowledge source module including an artificial intelligence operation scheme for execution on the blackboard objects, the control module comprising:
- an event detector module, in communication with the blackboard module, receiving all input data and determining when the at least one knowledge source module should execute; and
- an activation/agenda manager module, in communication with the at least one knowledge source module and the event detector module, executing the at least one knowledge source module in accordance with a predetermined knowledge source priority scheme;
- wherein the activation/agenda manager module further includes:
  - a priority based algorithm for determining activation of event driven knowledge sources;
  - a time-based queue for periodic knowledge sources; and
  - a knowledge source/precondition expression structure for checking knowledge source execution preconditions; and
- wherein the event detector module further includes a message evaluator, receiving messages related to input data, checking the messages for syntax errors and implementing a hash table algorithm if no syntax error is found.

* * * * *